US011221303B2

(12) United States Patent
Makifuchi

(10) Patent No.: US 11,221,303 B2
(45) Date of Patent: Jan. 11, 2022

(54) RADIATION CAPTURING SYSTEM

(71) Applicant: Konica Minolta, Inc., Tokyo (JP)

(72) Inventor: Chiho Makifuchi, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 784 days.

(21) Appl. No.: 15/467,467

(22) Filed: Mar. 23, 2017

(65) Prior Publication Data

US 2017/0284948 A1    Oct. 5, 2017

(30) Foreign Application Priority Data

Mar. 30, 2016    (JP) .............................. JP2016-067145

(51) Int. Cl.
| | | |
|---|---|---|
| *G01N 23/20* | (2018.01) | |
| *G21K 1/06* | (2006.01) | |
| *G21K 1/02* | (2006.01) | |
| *G01N 23/04* | (2018.01) | |

(52) U.S. Cl.
CPC ....... *G01N 23/20075* (2013.01); *G01N 23/04* (2013.01); *G21K 1/025* (2013.01); *G21K 1/06* (2013.01); *G01N 2223/064* (2013.01); *G21K 2207/005* (2013.01)

(58) Field of Classification Search
CPC ............. G01N 2223/064; G01N 23/04; G01N 23/20075; G21K 1/025; G21K 2207/005; G21K 1/06; A61B 6/484; A61B 6/4291
See application file for complete search history.

(56) References Cited

U.S. PATENT DOCUMENTS

| | | | | |
|---|---|---|---|---|
| 7,180,979 | B2 * | 2/2007 | Momose | A61B 6/4291 378/62 |
| 8,848,863 | B2 * | 9/2014 | Schusser | A61B 6/484 378/16 |
| 10,085,701 | B2 * | 10/2018 | Hoshino | A61B 6/04 |
| 2005/0286680 | A1 * | 12/2005 | Momose | G01N 23/20075 378/62 |

(Continued)

FOREIGN PATENT DOCUMENTS

| | | | |
|---|---|---|---|
| JP | 4445397 | B2 | 4/2010 |
| JP | 2014004486 | * | 1/2014 |

(Continued)

OTHER PUBLICATIONS

Machine translation of JP 201404486 (Year: 2014).*
Office Action dated Apr. 16, 2019 for corresponding Japanese Patent Application No. 2016-067145 (translation).

*Primary Examiner* — Dani Fox
*Assistant Examiner* — Soorena Kefayati
(74) *Attorney, Agent, or Firm* — Lucas & Mercanti, LLP

(57) ABSTRACT

A radiation capturing system includes the following. A radiation source, a plurality of gratings, and a radiation detector, are provided aligned in a radiation irradiating axis direction. A Talbot interferometer or a Talbot-Lau interferometer captures a moire fringe image for generating a reconstructed image. A low visibility capturing unit performs capturing of the moire fringe image with visibility of a moire fringe reduced more than in capturing of the moire fringe image for generating the reconstructed image. A generating unit generates an absorptive image based on the moire fringe image captured by the low visibility capturing unit.

10 Claims, 15 Drawing Sheets

(56) References Cited

U.S. PATENT DOCUMENTS

| | | | |
|---|---|---|---|
| 2009/0316857 A1* | 12/2009 | David | G01N 23/041 378/62 |
| 2010/0119041 A1* | 5/2010 | Ohara | A61B 6/484 378/87 |
| 2010/0290590 A1* | 11/2010 | Ouchi | G01J 9/02 378/62 |
| 2010/0296628 A1* | 11/2010 | Kuwabara | A61B 6/583 378/62 |
| 2010/0327175 A1* | 12/2010 | Nesterets | G02B 26/0808 250/393 |
| 2011/0293064 A1* | 12/2011 | Huang | B82Y 10/00 378/6 |
| 2012/0051508 A1* | 3/2012 | Kaneko | G21K 1/025 378/62 |
| 2012/0224670 A1* | 9/2012 | Kiyohara | A61B 6/4291 378/62 |
| 2013/0011040 A1* | 1/2013 | Kido | G01N 23/04 382/132 |
| 2013/0083893 A1* | 4/2013 | Ishii | A61B 6/4291 378/62 |
| 2013/0142307 A1* | 6/2013 | Nakamura | G01N 23/04 378/62 |
| 2013/0201198 A1* | 8/2013 | Nagatsuka | A61B 6/463 345/581 |
| 2013/0259194 A1* | 10/2013 | Yip | A61B 6/502 378/37 |
| 2014/0010344 A1* | 1/2014 | Nagatsuka | A61B 6/06 378/37 |
| 2014/0112440 A1* | 4/2014 | David | A61B 6/4035 378/62 |
| 2014/0126690 A1* | 5/2014 | Yamaguchi | A61B 6/484 378/36 |
| 2014/0198895 A1* | 7/2014 | Hoshino | A61B 6/484 378/36 |
| 2014/0270060 A1* | 9/2014 | Date | A61B 6/484 378/36 |
| 2014/0286477 A1* | 9/2014 | Ishii | A61B 6/04 378/62 |
| 2015/0023465 A1* | 1/2015 | Sato | G01N 23/20075 378/36 |
| 2015/0055743 A1* | 2/2015 | Vedantham | G21K 1/067 378/36 |
| 2015/0139385 A1* | 5/2015 | Bone | G06T 7/521 378/36 |
| 2015/0310609 A1* | 10/2015 | Sperl | G01N 23/041 382/132 |
| 2015/0355112 A1* | 12/2015 | Sato | G01N 23/04 708/205 |
| 2016/0252470 A1* | 9/2016 | Momose | G21K 1/06 378/36 |
| 2016/0317112 A1* | 11/2016 | Roessl | A61B 6/585 |
| 2016/0324496 A1* | 11/2016 | Fredenberg | A61B 6/4241 |
| 2017/0003233 A1* | 1/2017 | Yoneyama | G01N 23/046 |
| 2018/0294065 A1* | 10/2018 | Martens | G21K 1/06 |

FOREIGN PATENT DOCUMENTS

| | | |
|---|---|---|
| JP | 2014004486 A | 1/2014 |
| WO | 2016177875 A1 | 11/2016 |

\* cited by examiner

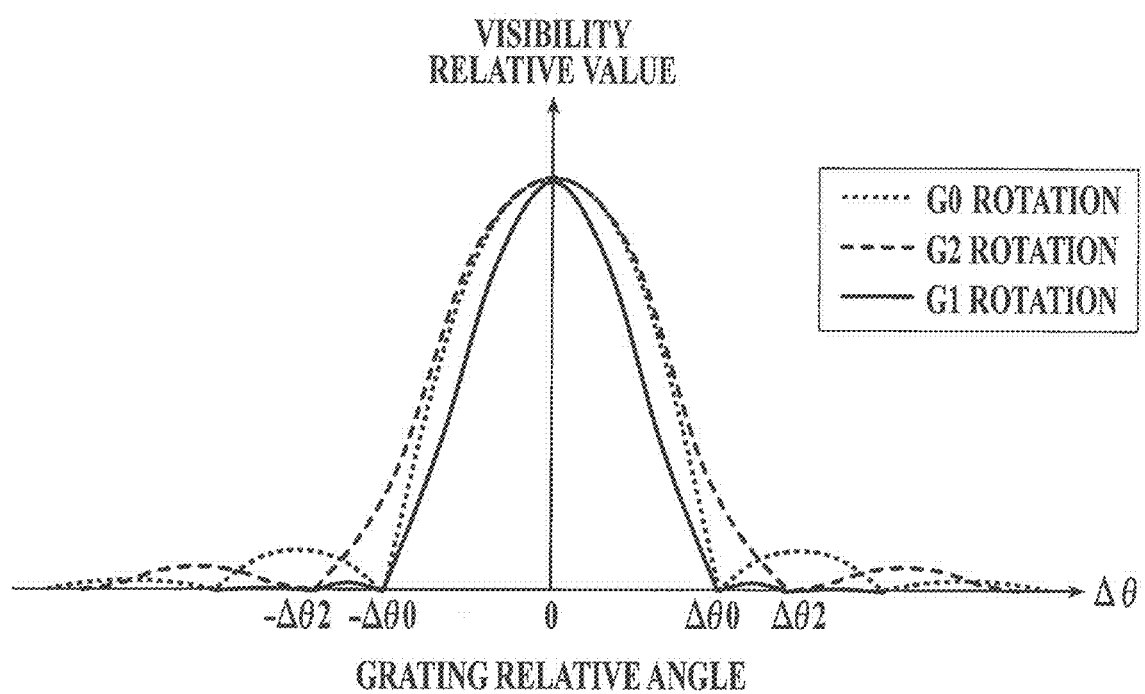

RADIATION CAPTURING SYSTEM

CROSS-REFERENCE TO RELATED APPLICATIONS

The present U.S. patent application claims priority under the Paris Convention of Japanese Patent Application No. 2016-067145 filed on Mar. 30, 2016 the entirety of which is incorporated herein by reference.

BACKGROUND OF THE INVENTION

Field of the Invention

The present invention relates to a radiation capturing system.

Description of Related Art

In order to obtain a high resolution image with a radiation capturing apparatus using a Talbot interferometer or a Talbot-Lau interferometer, a fringe scanning method is used in which one grating from a plurality of gratings is moved 1/M (M is a positive integral number, absorptive image is M>2, phase differential image and small angle scattering image is M>3) of a slit period in a slit period direction, capturing is performed M times (moire fringe image), and the images are reconstructed (for example, Japanese Patent No. 4445397).

However, according to the fringe scanning method, grating is moved and stopped repeatedly to capture a plurality of moire fringe images, and after the data is collected, arithmetic processing is performed to generate reconstructed images (phase differential image, small angle scattering image, absorptive image). Therefore, even if only an absorptive image is necessary for purposes such as confirming positioning of the subject before actual capturing by fringe scanning, adjustment and status monitoring of the grating, radiation source, radiation detector, etc., and collection of calibration data for devices such as the grating, the radiation source, and the radiation detector, etc., it is not easy to capture the absorptive image as in a simple X-ray capturing apparatus.

Moreover, since the capturing time is long, false images due to the body movement of the subject and the change in the position of the grating are generated.

BRIEF SUMMARY OF THE INVENTION

The present invention is conceived in view of the above, and the object of the present invention is to provide a radiation capturing system using a Talbot interferometer or a Talbot-Lau interferometer in which an absorptive image can be generated by easy capturing without removing the grating from the field of view.

According to one aspect of the present invention, there is provided a radiation capturing system including: a radiation source, a plurality of gratings, and a radiation detector, provided aligned in a radiation irradiating axis direction; a Talbot interferometer or a Talbot-Lau interferometer to capture a moire fringe image for generating a reconstructed image; a low visibility capturing unit which performs capturing of the moire fringe image with visibility of a moire fringe reduced more than in capturing of the moire fringe image for generating the reconstructed image; and a generating unit which generates an absorptive image based on the moire fringe image captured by the low visibility capturing unit.

BRIEF DESCRIPTION OF THE DRAWINGS

The present invention will become more fully understood from the detailed description given hereinbelow and the appended drawings, and thus are not intended to define the limits of the present invention, and wherein;

FIG. 13 is a schematic diagram showing a relation between rotation of the multi-slit, first grating, and second grating around a radiation irradiating axis and moire fringe visibility;

DETAILED DESCRIPTION OF PREFERRED EMBODIMENTS

An embodiment according to the present invention is described with reference to the drawings. The present invention is not limited to the illustrated examples.

First Embodiment (Configuration of Radiation Capturing System)

Figure 1:
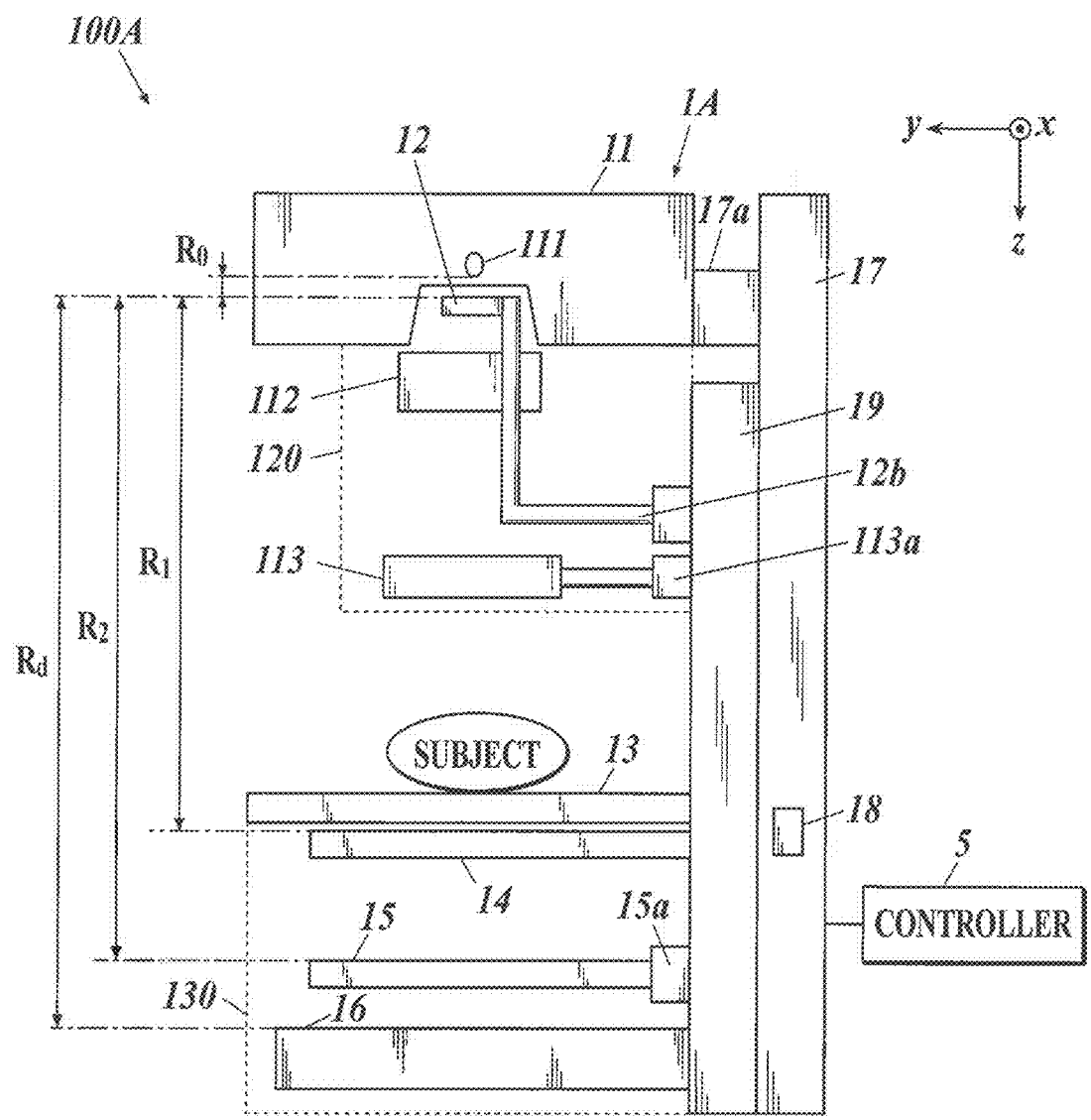
FIG. 1 is a diagram showing an example of a configuration of a radiation capturing system according to the first embodiment.

FIG. 1 is a diagram schematically showing a radiation capturing system 100A according to a first embodiment of the present invention.

As shown in FIG. 1, the radiation capturing system 100A includes a radiation capturing apparatus 1A and a controller 5. The radiation capturing apparatus 1A performs X-ray capturing with a Talbot-Lau interferometer and the controller 5 generates a reconstructed image using the moire fringe images obtained in the X-ray capturing. According to the description below, the radiation capturing system performs capturing using the X-ray, but other radiation such as a neutron ray, a gamma ray, etc. can be used.

As shown in FIG. 1, the radiation capturing apparatus 1A includes a radiation source 11, a first cover unit 120 including a multi-slit 12, a second cover unit 130 including a subject stage 13, a first grating 14, a second grating 15, and a radiation detector 16, a post 17, a main body 18, and a base 19. The radiation capturing apparatus 1A is a vertical type, and the radiation source 11, the multi-slit 12, the subject stage 13, the first grating 14, the second grating 15, and the radiation detector 16 are positioned in this order in the z-direction which is the gravity direction. A distance between a focal point 111 of the radiation source 11 and the multi-slit 12 is represented by $R_0$ (mm), a distance between the multi-slit 12 and the radiation detector 16 is represented by Rd (mm), a distance between the multi-slit 12 and the first grating 14 is represented by $R_1$ (mm), and the distance between the multi-slit 12 and the second grating 15 is represented by $R_2$ (mm).

Preferably, the distance $R_0$ is 5 to 500 (mm) and more preferably, 5 to 300 (mm).

Since a height of a capturing room in a radiation department is typically about 3 (m) or smaller, preferably, the distance $R_d$ is at least 3000 (mm) or smaller. Specifically, the distance $R_d$ is preferably 400 to 5000 (mm) and more preferably 500 to 2000 (mm).

The distance $(R_0+R_1)$ between the focal point 111 of the radiation source 11 and the first grating 14 is preferably 300 to 5000 (mm), and more preferably 400 to 1800 (mm).

The distance $(R_0+R_2)$ between the focal point 111 of the radiation source 11 and the second grating 15 is preferably 400 to 5000 (mm), and more preferably 500 to 2000 (mm).

Each distance is set by calculating the most suitable distance in which the grating image (self-image) by the first grating 14 overlaps on the second grating 15 from the wavelength of the radiation irradiated from the radiation source 11.

The multi-slit 12, the subject stage 13, the first grating 14, the second grating 15, and the radiation detector 16 are attached to the post 17 supported by the same base 19. The base 19 may be movable with respect to the post 17 in the z-direction.

In addition to the base 19, the radiation source 11 and the main body 18 are attached to the post 17. The radiation source 11 is supported by the post 17 through a buffer 17*a*. Any material can be used for the buffer 17*a* as long as the material is able to absorb shock and vibration, and an example of such material may be elastomer. Since the radiation source 11 emits heat when the radiation is irradiated, it is preferable that the buffer 17*a* further includes a heat insulating material on the radiation source 11 side.

The radiation source 11 includes an X-ray tube, and the X-ray tube generates the X-ray to be irradiated in the z-direction (gravity direction). For example, a Coolidge X-ray tube or a rotating anode X-ray tube which are widely used in the field of medicine can be used as the X-ray tube. Tungsten and molybdenum can be used as the anode.

The focal diameter of the radiation source 11 is preferably 0.03 to 3 (mm), and more preferably 0.1 to 1 (mm).

The first cover unit 120 is a unit provided directly below the radiation source 11. As shown in FIG. 1, the first cover unit 120 includes a multi-slit 12, an attachment arm 12*b*, an additional filter/collimator 112, a scatterer 113, and the like. Each component of the first cover unit 120 is covered and protected by a cover member.

Figure 2:
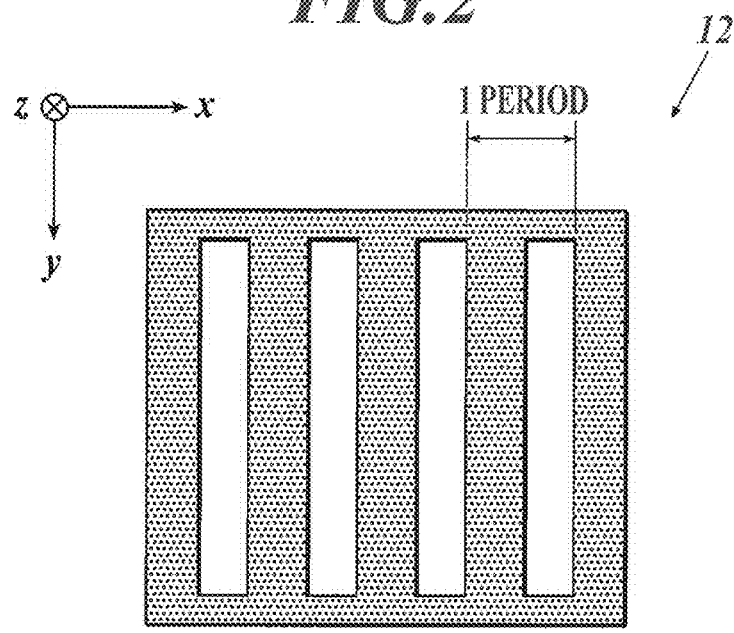
FIG. 2 is a planar view of a multi-slit.

As shown in FIG. 2, the multi-slit 12 (G0 grating) is a diffraction grating and a plurality of slits are provided aligned with a predetermined interval in the x-direction which is orthogonal to a radiation irradiating axis direction (here, z-direction). The multi-slit 12 is formed with material with large radiation shielding power, that is, high radiation absorptivity such as tungsten, lead, or gold on a substrate including low radiation absorptivity material such as silicon or glass. For example, a resist layer is masked with a slit shape by photolithography and UV is irradiated to transfer the slit pattern on the resist layer. A slit configuration with the same shape as the pattern is obtained by exposure, metal is filled in the slit configuration by electroforming method, and with this, the multi-slit 12 is formed.

The slit period (grating period) $d_0$ of the multi-slit 12 is 1 to 60 (μm). The slit period is set so that the distance between the adjacent slits is to be one period as shown in FIG. 2. A width of the slit (length of each slit in the slit period direction (x-direction)) is 1 to 60(%) of the length of the slit period, and more preferably 10 to 40(%). The height of the slit (height in the z-direction) is 1 to 500 (μm), preferably 1 to 150 (μm). The multi-slit 12 is supported by the attaching arm 12*b* and attached to the base 19.

The additional filter/collimator 112 limits the irradiating region of the X-ray irradiated from the radiation source 11 and removes the low energy component which does not contribute to the capturing from the X-ray irradiated from the radiation source 11.

Preferably, the scatterer 113 reduces the visibility of the moire fringe, strongly scatters the X-ray and has low absorption. The scatterer 113 is configured to be movable in the x-direction or the y-direction by a moving mechanism 113*a*. The scatterer 113 is moved by the moving mechanism 113*a* and is inserted in the irradiating field or is withdrawn outside the irradiating field. Any mechanism which is able to move the scatterer 113 in a straight line in the x-direction or the y-direction by driving with a motor, etc. can be employed as the moving mechanism 113*a*.

As shown in FIG. 1, the second cover unit 130 includes the subject stage 13, the first grating 14 and the second grating 15, the moving mechanism 15*a*, the radiation detector 16, and the like. The upper surface of the second cover unit 130 is to be the subject stage 13. The covering member covers the surroundings of the subject stage 13 to protect the internal components from damage by touch from the patient or technician and from incoming dust. Since the temperature of the unit is hardly influenced by the outside air, it is possible to reduce the change of the grating position due to thermal expansion, etc. of the first grating 14 and the second grating 15.

The subject stage 13 is a stage to place the subject.

Similar to the multi-slit 12, the first grating 14 (G1 grating) is the diffraction grating provided with a plurality of slits aligned in the z-direction which is the radiation irradiating axis direction and the x-direction orthogonal to the z-direction. The first grating 14 can be formed by photolithography using UV similar to the multi-slit 12, or can be formed by performing deep digging processing with fine lines on the silicon substrate by the ICP method to form a grating configuration including only silicon. The slit period $d_1$ of the first grating 14 is 1 to 20 (μm). The width of the slit is 20 to 70(%) of the slit period, and preferably, 35 to 60(%). The height of the slit is 1 to 100 (μm).

Similar to the multi-slit 12, the second grating 15 (G2 grating) is the diffraction grating provided with a plurality of slits aligned in the z-direction which is the radiation irradiating axis direction and the x-direction orthogonal to the z-direction. The second grating 15 can also be formed by photolithography. The slit period $d_2$ of the second grating 15 is 1 to 20 (μm). The width of the slit is 30 to 70(%) of the slit period, and preferably, 35 to 60(%). The height of the slit is 1 to 100 (μm). A moving mechanism 15*a* to move the second grating in the x-direction is provided adjacent to the second grating 15. The moving mechanism 15*a* may be any mechanism which is able to move the second grating 15 in a straight line in the x-direction by driving with a motor, etc.

In the radiation detector 16, transducers which generate electric signals according to the irradiated radiation are provided two-dimensionally and the electric signals generated by the transducers are read as the image signal. The pixel size of the radiation detector 16 is 10 to 300 (μm), and preferably 50 to 200 (μm). Preferably, the position of the radiation detector 16 is fixed to the base 19 so as to come into contact with the second grating 15. As the distance between the second grating 15 and the radiation detector 16 becomes larger, the moire fringe image obtained by the radiation detector 16 becomes more blurred.

As the radiation detector 16, a flat panel detector (FPD) can be used. Such FPD includes an indirect conversion type which converts the radiation to electric signals by photoelectric transducers through a scintillator or a direct conversion type which directly converts the radiation to electric signals. Either type may be employed.

A radiation detector provided with a strength modulation effect of the second grating 15 can be used as the radiation detector 16. For example, in order to provide to the scintillator an insensible region with the same period and width as the slit of the second grating 15, a groove may be dug in the scintillator and the slit scintillator detector with the grating shaped scintillator can be used as the radiation detector 16 (reference document 1: Simon Rutishauser et al., "Structured scintillator for hard x-ray grating interferometery", APPLIED PHYSICS LETTERS 98, 171107 (2011)). The radiation detector 16 with such configuration includes a second grating 15 and a radiation detector 16. Therefore, the second grating 15 does not have to be provided separately. That is, including such slit scintillator means including the second grating 15 and the radiation detector 16.

Figure 3:
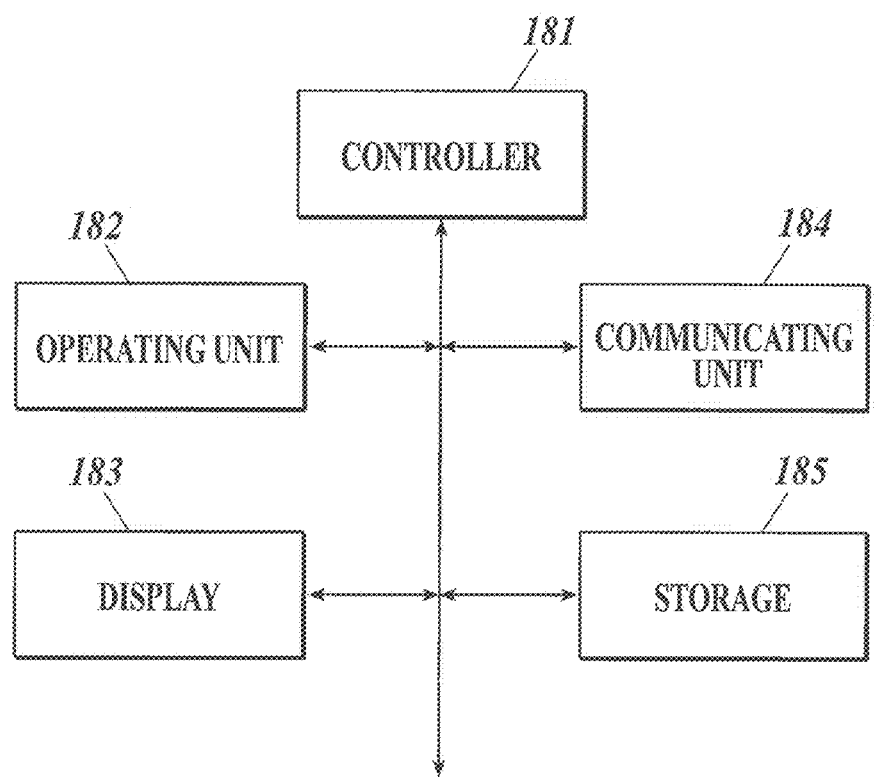
FIG. 3 is a block diagram showing a functional configuration of a main body.

As shown in FIG. 3, the main body 18 includes a controller 181, an operating unit 182, a display 183, a communicating unit 184, and a storage 185.

The controller 181 includes a CPU (Central Processing Unit), a RAM (Random Access Memory), and the like, and the controller 181 performs various processing in coordination with the program stored in the storage 185. The controller 181 is connected to various units outside the main body 18 (for example, radiation source 11, radiation detector 16, moving mechanism 15a, moving mechanism 113a, etc.). The controller 181 performs later-described radiation capturing controlling processing A to control each unit of the radiation capturing apparatus 1A to generate the moire fringe image.

In addition to the emitting switch and the keys used for input of the capturing condition, the operating unit 182 includes a touch panel configured as one with the display 183, and the operating unit 182 generates operating signals according to operation of the above, and outputs the signals to the controller 181.

The display 183 displays on the display an operating screen, operating status of the radiation capturing apparatus 1A, etc. according to control from the controller 181.

The communicating unit 184 includes a communicating interface and communicates with the controller 5 on the network. For example, the communicating unit 184 transmits to the controller 5 the moire fringe image read by the radiation detector 16 and stored in the storage 185.

The storage 185 stores the program performed by the controller 181 and data necessary to perform the program. The storage 185 stores the moire fringe image obtained by the radiation detector 16.

The radiation capturing apparatus 1A is described as irradiating X-ray from the radiation source 11 provided on the upper side to the subject below (vertical type), but the type is not limited to the above and can irradiate the X-ray from the radiation source 11 provided on the lower side to the subject above. Moreover, the X-ray can be irradiated in any other direction such as the horizontal direction (horizontal type).

The controller 5 is a computer apparatus including a CPU, RAM, storage, operating unit, display, communicating unit, etc., and controls the capturing by the radiation capturing apparatus 1A according to the operation by the operator. The controller 5 performs image processing on the series of moire fringe images obtained by the radiation capturing apparatus 1A as the image processing apparatus. For example, the controller 5 generates a reconstructed image using the series of moire fringe images obtained by the moire fringe scanning method in the radiation capturing apparatus 1A.

(Operation of Radiation Capturing System)

Here, the capturing method by the Talbot-Lau interferometer of the radiation capturing apparatus 1A is described.

Figure 4:
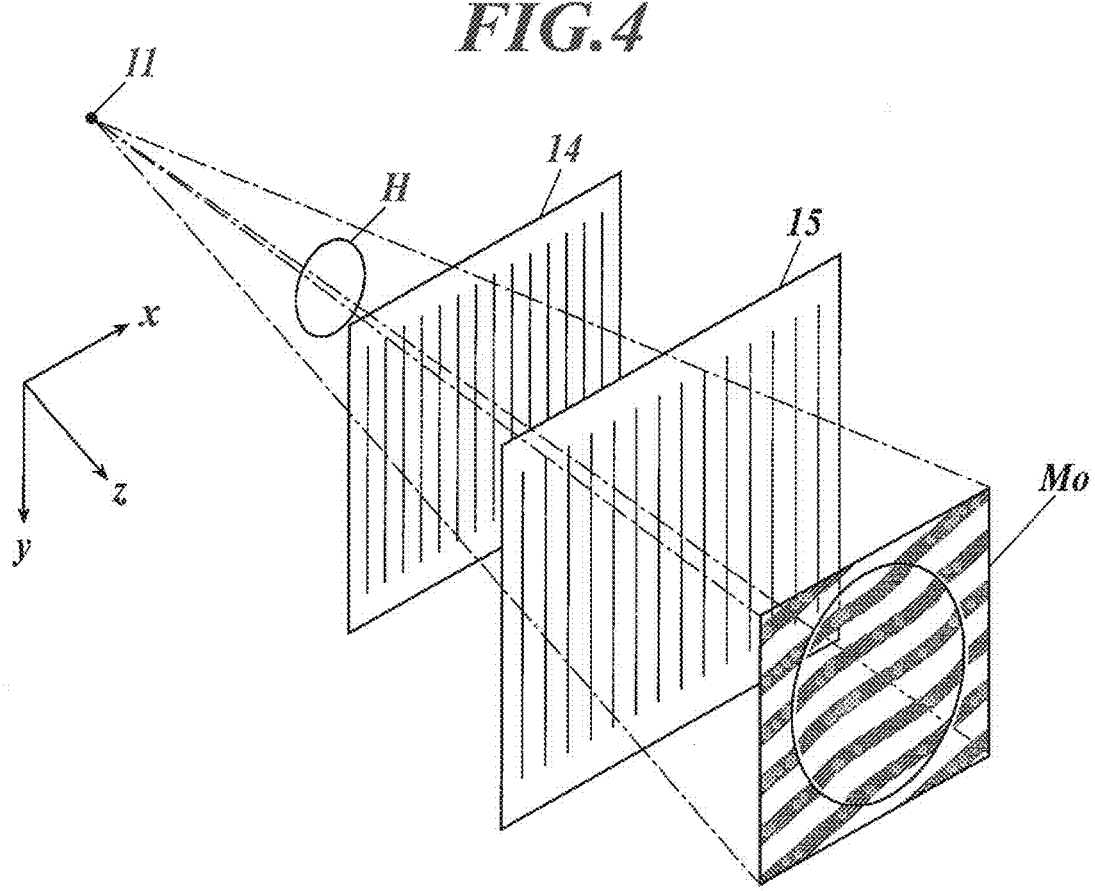
FIG. 4 is a diagram describing a principle of the Talbot interferometer.

As shown in FIG. 4, when the X-ray irradiated from the radiation source 11 passes through the first grating 14, the X-ray which passed through form images at a certain interval in the z-direction. Such image is called a self-image, and the phenomenon of forming such self-image is called Talbot effect. The second grating 15 is positioned substantially parallel to the self-image in a position where the self-image is formed, and the moire fringe image (shown with Mo in FIG. 4) can be obtained by the X-ray passing through the second grating 15. That is, the first grating 14 forms a period pattern and the second grating 15 converts the period pattern to the moire fringe image. When there is a subject (shown with H in FIG. 4) between the radiation source 11 and the first grating 14, the phase of the X-ray is shifted by the subject, and the moire fringe in the moire fringe image is disarranged with the edge of the subject as the boundary as shown in FIG. 4. Such disarranged moire fringe is detected by processing the moire fringe image, and the subject can be imaged. This is the principle of the Talbot interferometer.

In the radiation capturing apparatus 1A, the multi-slit 12 is positioned near the radiation source 11 between the radiation source 11 and the first grating 14, and the X-ray capturing is performed by the Talbot-Lau interferometer. It is assumed that in the Talbot interferometer, the radiation source 11 is an ideal point source. In the actual capturing, a focus with a relatively large focal diameter is used. Therefore, it is possible to obtain the effect that the X-ray is irradiated with a plurality of aligned point sources by the multi-slit 12. This is the X-ray capturing method by the Talbot-Lau interferometer, and even when the focal diameter is relatively large, the Talbot effect similar to the Talbot interferometer can be obtained.

In the radiation capturing apparatus 1A, the moire fringe image necessary to generate the reconstructed image of the subject is captured by the fringe scanning method. According to the fringe scanning, generally, any one (second grating 15 in the present embodiment) or two among the gratings (multi-slit 12, first grating 14, second grating 15) is relatively moved in the slit period direction (x-direction) M times (M is a positive integer, absorptive image is M>2, and differential phase image and small angle scattering image is M>3) to perform capturing (capturing M steps), and M moire fringe images necessary for generating the reconstructed image are obtained. Specifically, when the slit period of the moved grating is d ($\mu$m), capturing is repeatedly performed with the grating moved in the slit period direction d/M ($\mu$m) each time, and the M moire fringe images are obtained.

However, according to the fringe scanning method, grating is moved and stopped repeatedly to capture a plurality of moire fringe images, and after the data is collected, arithmetic processing is performed to generate reconstructed images. Therefore, even if only an absorptive image is necessary for purposes such as confirming positioning of the subject before actual capturing by fringe scanning, adjustment and status monitoring of the grating, radiation source, radiation detector, etc., and collection of calibration data for devices such as the grating, the radiation source, the radiation detector, etc., it is not easy to capture the absorptive image as in a simple X-ray capturing apparatus.

Moreover, since the capturing time is long in the fringe scanning method, false images due to the body movement of the subject and the change in the position of the grating are generated.

Here, the plurality of moire fringe images obtained by the fringe scanning method and the absorptive image which can be obtained from calculating the above are described.

The absorptive image is generated from the plurality of moire fringe images obtained by the fringe scanning method according to the following. As shown in (formula 1) described below, the image (image added with the signal values of corresponding pixels) added with the plurality of moire fringe images (hereinafter referred to as subject moire fringe image) including the subject captured with the subject positioned is divided by the image added with the moire fringe image (hereinafter referred to as BG moire fringe image) without the subject captured without positioning the subject (dividing the signal values of each pixel with the signal values of the corresponding pixels). With this, the transmissivity image is generated. Next, the logarithmic conversion is performed on the transmissivity image as shown in (formula 2).

$$tr(x,y) = \Sigma_{k=1}^{M} Is_k(x,y) / \Sigma_{k=1}^{M} Ir_k(x,y) \quad \text{(formula 1)}$$

$$at(x,y) = -\ln[tr(x,y)] \quad \text{(formula 2)}$$

In the formulas above, at is the signal value of the absorptive image, tr is the signal value of the transmissivity image, Is is the signal value of the subject moire fringe image, and Ir is the signal value of the BG moire fringe image. In the formulas above, x, y show the two-dimensional coordinates of the pixels. M shows the number of times of fringe scanning.

Figure 5:
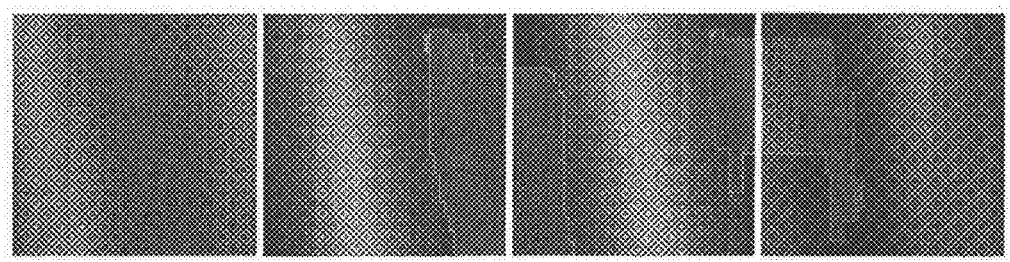
FIG. 5 shows four subject moire fringe images captured with the fringe scanning method by moving the second grating ¼ of the slit period in the slit period direction.
Figure 6:
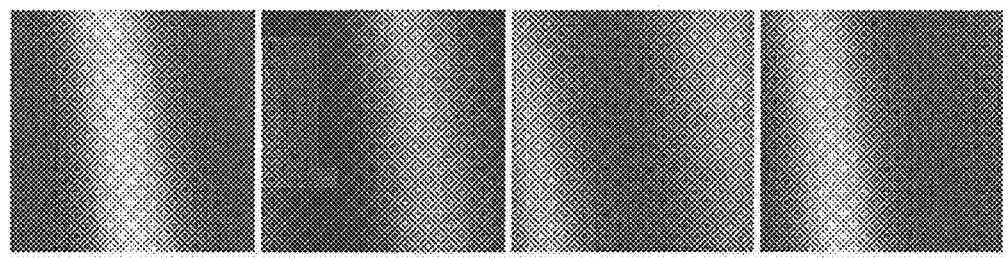
FIG. 6 shows four BG moire fringe images captured with a grating position similar to capturing the subject moire fringe images shown in FIG. 5.
Figures 7A, 7B, 7C, 7D:
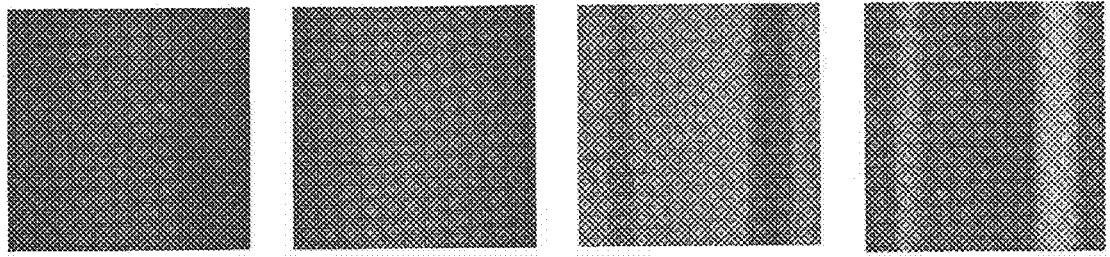
FIG. 7A is an image adding four subject moire fringe images shown in FIG. 5.
FIG. 7B is an image adding four BG moire fringe images shown in FIG. 6.
FIG. 7C is a transmissivity image obtained by dividing the image shown in FIG. 7A by the image shown in FIG. 7B.
FIG. 7D is an absorptive image obtained by logarithmic conversion of the transmissivity image shown in FIG. 7C.

FIG. 5 shows four subject moire fringe images captured with the fringe scanning method by moving the second grating 15 ¼ of the period of the second grating 15 each time in the slit period direction and changing the phase of the moire fringe ½π each time. FIG. 6 shows four BG moire fringe images captured in the grating position similar to when the subject moire fringe images shown in FIG. 5 are captured. FIG. 7A shows the added image of the four subject moire fringe images shown in FIG. 5. FIG. 7B shows the added image of the four BG moire fringe images shown in FIG. 6. FIG. 7C shows the transmissivity image obtained by dividing the image shown in FIG. 7A by the image shown in FIG. 7B. FIG. 7D shows the absorptive image obtained by performing logarithmic conversion on the transmissivity image shown in FIG. 7C.

The subject of FIG. 5 is PMMA cylinders with diameters of 3 mm and 5 mm positioned in a case of PMMA (acryl). The case of the PMMA is a rectangular parallelepiped case formed from PMMA plates with a thickness of 6 mm. The subject moire fringe image shown in FIG. 5 shows transmission through PMMA with at least 12 mm in spots other than the cylinder.

The image shown in FIG. 5 to FIG. 6 are captured with a radiation capturing apparatus with the following specifications. The experimental images of the other embodiments according to the present description are all captured by the radiation capturing apparatus with the following specifications.

X-direction focal diameter Σx: 370 um, y-direction focal diameter Σy: 400 um
  period $d_0$ of multi-slit 12: 22.8 um
  period $d_1$ of first grating 14: 4.3 um
  period $d_2$ of second grating 15: 5.3 um
  pixel size of radiation detector 16: 85 um, vertical and horizontal
  distance $R_0$ between focal point and multi-slit 12: 65 mm
  distance $R_1$ between multi-slit 12 and first grating 14: 1107 mm
  distance $R_2$ between multi-slit 12 and second grating 15: 1364 mm
  distance $R_d$ between multi-slit 12 and radiation detector 16: 1374 mm As shown in (formula 2), the absorptive image is generated by simply performing logarithmic conversion on the transmissivity image and if the transmissivity image is correctly made, the absorptive image is also correct. In order to simplify the description, the transmissivity image before lograithic conversion is used in the description instead of the absorptive image.

As shown in FIG. 5, it is difficult to use the subject moire fringe image as the transmissivity image (absorptive image) as is. The visibility of the subject in the subject moire fringe image may become bad due to change in strength of the moire fringe. The way the subject looks in the four subject moire fringe images with different moire fringe phases may change due to change in the strength depending on the change of the moire fringe phase by the subject. When the subject is the above-described cylinder, the edge is white or black and it is clear that it is greatly different from the transmissivity image shown in FIG. 7C.

Figure 8:
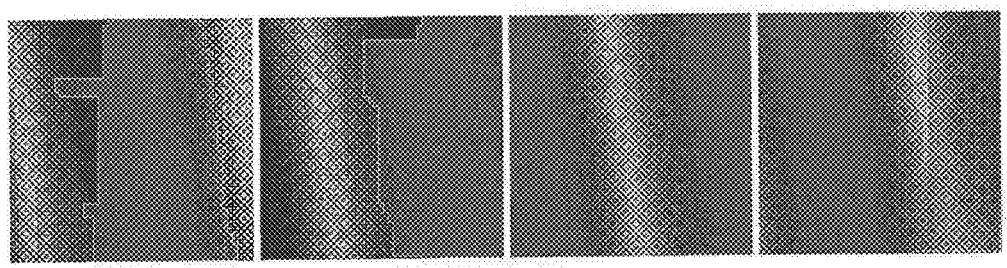
FIG. 8 shows images dividing each of the four subject moire fringe images shown in FIG. 5 by the BG moire fringe images shown in FIG. 6 with the same grating position.

FIG. 8 shows the images of dividing each of the four subject moire fringe images shown in FIG. 5 by the BG moire fringe image with the same grating position shown in FIG. 6. As shown in FIG. 8, even if all of the grating positions are the same, since the phase of the moire fringe changes depending on the subject, the moire fringe of the subject moire fringe image and the BG moire fringe image are not the same. Therefore, even if the subject moire fringe image is divided by the BG moire fringe image, the moire fringe is not erased. Consequently, the above cannot be used as the transmissivity image (absorptive image).

Figure 9:
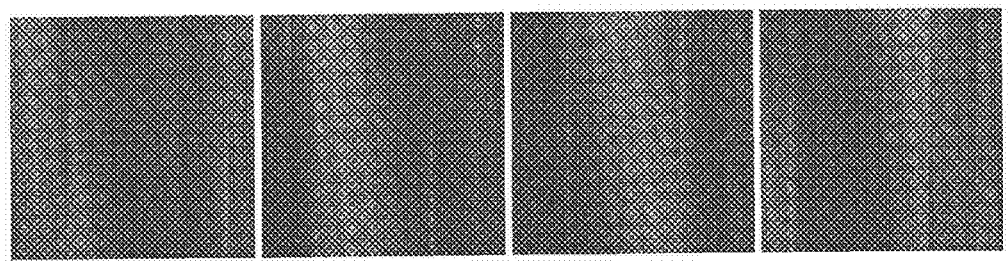
FIG. 9 shows images in which frequency processing is performed on each of the four subject moire fringe images shown in FIG. 5.

FIG. 9 shows images in which frequency processing is performed on each of the four subject moire fringe images shown in FIG. 5 and in which the moire fringe is reduced. As shown in FIG. 9, the moire fringe is not even in the plane due to manufacturing error in the grating configuration and it is difficult to completely erase the moire fringe by frequency processing. Even if the moire fringe can be completely erased by frequency processing, it is difficult to erase the change in strength due to the moire fringe phase change by the subject. That is, even if the frequency processing is performed on one subject moire fringe image, this is greatly different from the transmissivity image (absorptive image) shown in FIG. 7C, and therefore, cannot be used as the transmissivity image (absorptive image).

It is known that in order to make the reconstructed image clear when using the Talbot apparatus and the Talbot-Lau apparatus, the moire fringe of each moire fringe image used for generating the reconstructed image needs to be clear (for example, reference document 2: "moire fringe and interference fringe applied measurement", Tomoharu YAMADA, Shunsuke YOKOZEKI, Corona Publishing CO., LTD., page 15, Dec. 10, 1996). Therefore, typically, the grating position and the distance between the gratings are set in advance in the radiation capturing apparatus which performs capturing by the fringe scanning method so that the visibility of the moire fringe is enhanced. Here, the visibility (vis) of the moire fringe can be calculated by the (formula 3) described below.

$$vis(x,y) = \frac{a_1(x,y)}{a_0(x,y)} = \frac{2\left|\sum_{k=0}^{M-1} I_k(x,y)\exp\left(-2\pi i \frac{k}{M}\right)\right|}{\sum_{k=1}^{M} I_k(x,y)} \quad \text{(formula 3)}$$

In the above formula, $a_0$ shows the average strength of the moire fringe image, $a_1$ shows the amplitude of the moire fringe image, and I shows the signal value of the moire fringe image. In the above formula, vis includes the values from 0 to 1. For example, the visibility of the moire fringe image shown in FIG. 6 is about 0.3.

As a result of study, the inventors of the present invention found that as the visibility of the moire fringe is decreased and made closer to 0, a moire fringe image can be obtained without strength change of the moire fringe and the strength change according to the phase change of the moire fringe by the subject. The inventors also found a method to obtain the moire fringe image with the visibility of the moire fringe reduced more than by the capturing of the moire fringe image generated for the reconstructed image by only one capturing and without removing the grating, unlike in the fringe scanning method in which the grating is moved to perform capturing a plurality of times. As one method, the scatterer 113 is inserted in the irradiating field between the radiation source 11 and the radiation detector 16 in capturing. When the scatterer 113 is inserted and the X-ray is scattered in many directions, the generating of the moire fringe can be suppressed.

Material suitable for the scatterer 113 include, an acrylic case filled with powder with weak absorption, paper, wooden plywood such as fiber plate, CFRP (Carbon Fiber Reinforced Plastic), sandpaper (abrasive) and the like. The reduction amount of the visibility of the moire fringe depends on the size of the configuration of the scatterer 113, and when the shape of the configuration is a sphere, the suitable size r is provided by the (formula 4).

$$r = \begin{cases} pd_1 R_s / R_1 & (R_s \leq R_1) \\ pd_1 (R_2 - R_s)/(R_2 - R_1) & (R_s \geq R_1) \end{cases} \quad \text{(formula 4)}$$

Here, p shows the Talbot degree. Preferably, the size of the scatterer 113 is determined according to the position of the scatterer 113 in the radiation irradiating axis direction and the slit period of the grating. Even when the paper or wood is different from the optimum size, sufficient reduction of the visibility can be obtained by increasing the thickness in the radiation irradiating axis direction, and the present invention is not limited to the above conditions.

Below, the capturing operation in the radiation capturing apparatus 1A including the scatterer 113 and the image generating operation in the controller 5 are described.

Figure 10:
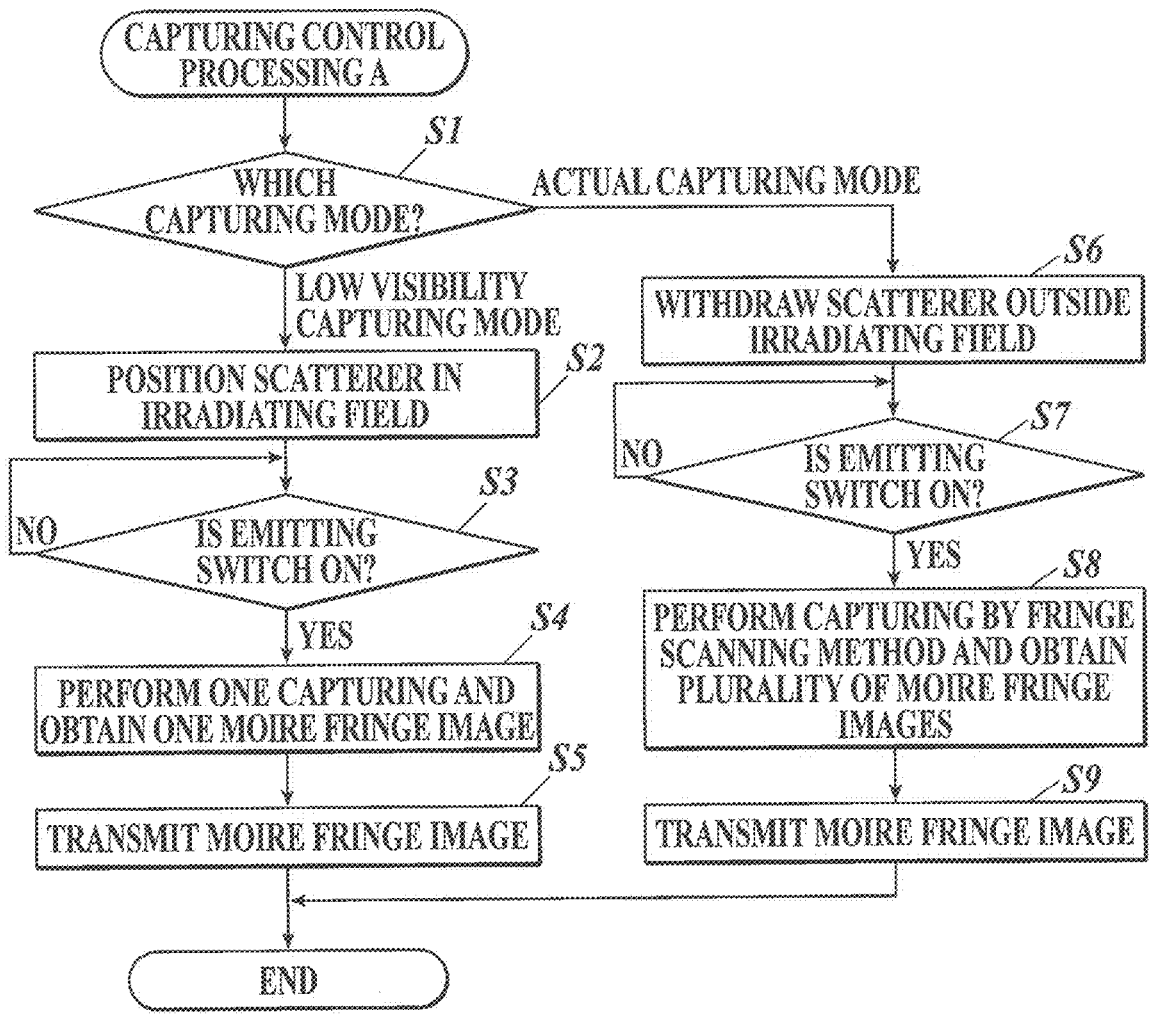
FIG. 10 is a flowchart showing capturing control processing A performed by the radiation capturing apparatus according to the first embodiment.

FIG. 10 shows a flowchart of capturing control processing A performed by the controller 181 of the radiation capturing apparatus 1A. The capturing control processing A is performed by the controller 181 in coordination with the program stored in the storage 185.

The controller 181 determines whether the capturing mode is the low clarity capturing mode or the actual capturing mode (step S1). Here, for example, the low visibility capturing mode is a mode which obtains the moire fringe image with the moire fringe visibility more reduced than the capturing by the fringe scanning method by simple capturing performed once in order to generate the absorptive image to confirm positioning, adjust the apparatus, collect calibration data, and the like. The actual capturing mode is the mode which performs the capturing by the fringe scanning method and obtains the plurality of moire fringe images in order to generate the reconstructed image of the subject. The low visibility capturing mode and the actual capturing mode can be set by operation of the operating unit 182 by the user.

When it determined that the capturing mode is the low visibility capturing mode (step S1; low visibility capturing mode), the controller 181 controls the moving mechanism 113a to position the scatterer 113 in the irradiating field (step S2).

Next, the controller 181 stands by for the emitting switch of the operating unit 182 to be turned ON by the operator (step S3). When the emitting switch of the operating unit 182 is turned ON (step S3; YES), the controller 181 controls the radiation source 11 and the radiation detector 16 and obtains one moire fringe image by performing capturing once without moving the second grating 15 (step S4). That is, the X-ray is emitted once from the radiation source 11 and one moire fringe image is obtained by the radiation detector 16. Specifically, after resetting the radiation detector 16 to remove unnecessary charge remaining from the previous capturing, X-ray irradiating by the radiation source 11 is performed, the charge is accumulated in the radiation detector 16 according to the timing of the X-ray irradiating, and the accumulated charge is read as the image signal according to the timing that the X-ray irradiating is stopped.

The controller 181 transmits the moire fringe image to the controller 5 with the communicating unit 184 (step S5), and the capturing control processing A ends.

When it is determined that the capturing mode is the actual capturing mode (step S1; actual capturing mode), the controller 181 controls the moving mechanism 113a and withdraws the scatterer 113 outside the irradiating field (step S6).

Next, the controller 181 stands by for the emitting switch of the operating unit 182 to be turned ON by the operator (step S7). When the emitting switch of the operating unit 182 is turned ON (step S7; YES), the controller 181 controls the radiation source 11, the radiation detector 16, and the moving mechanism 15a to perform the plurality of steps (M steps) of capturing by the fringe scanning method, and obtains the plurality of moire fringe images (M images) (step S8).

In the capturing by the fringe scanning method, first, the X-ray irradiating by the radiation source 11 is started in a state with the second grating 15 stopped. After resetting the radiation detector 16 to remove the unnecessary charge remaining from the previous capturing, the charge is accumulated in the radiation detector 16 according to the timing of the X-ray irradiating, and the accumulated charge is read as the image signal according to the timing that the X-ray irradiating is stopped. This is capturing for one step. At the timing when the capturing of one step ends, the movement of the second grating 15 is started. After the second grating 15 is moved a predetermined amount, the second grating 15 is stopped and the capturing of the next step is performed. The moving amount of the second grating 15 is $d_2/M$. With this, the second grating 15 is moved and stopped repeatedly for a predetermined number of steps, and when the second grating 15 is stopped, the X-ray is irradiated and the image signal is read. When the capturing of moving the second grating 15 for one slit period ends, the series of capturing in order to obtain the plurality of moire fringe images necessary to generate one reconstructed image ends. After the capturing ends, the position of the second grating 15 is returned to the original position.

Then, the controller 181 uses the communicating unit 184 to transmit the moire fringe image to the controller 5 (step S9) and ends the capturing control processing A. When the image is transmitted from the communicating unit 184 to the controller 5, the images can be transmitted one by one each time the capturing in each step ends, or the images can be transmitted collectively after the capturing of all steps are finished and all moire fringe images are obtained.

In the controller 5, in order to correct the absorption unevenness of the grating and damage in the moire fringe image of the subject generated by the capturing with the subject positioned and the sensitivity unevenness of the radiation detector 16, in addition to the subject moire fringe image, it is necessary to generate the BG moire fringe image in which capturing without the subject is performed with the same grating position as capturing with the subject. The BG moire fringe image can be generated in the radiation capturing apparatus 1A by performing capturing without the subject positioned on the subject stage 13 before or after capturing the subject moire fringe image. Alternatively, the capturing can be performed in advance and the images can be stored in the storage of the controller 5. According to the present embodiment, a plurality of BG moire fringe images for generating the reconstructed images are stored in the storage of the controller 5 in advance. Later described offset correction processing, gain correction processing, defective pixel correction processing, X-ray strength change correction and the like are performed on the BG moire fringe images (same can be said for other embodiments).

When the controller 5 receives the subject moire fringe image generated in the low visibility capturing mode from the main body 18, the absorptive image is generated. Specifically, first, the offset correction processing, the gain correction processing, the defective pixel correction processing, the X-ray strength change correction, etc. are performed on the subject moire fringe image. Next, the corrected subject moire fringe image is divided by the image added with the BG moire fringe image for generating the reconstructed image stored in the storage to generate the transmissivity image. The logarithmic conversion is performed on the transmissivity image to generate the absorptive image. The generated absorptive image is displayed on the display.

When the controller 5 receives the string of subject moire fringe images generated in the actual capturing mode from the main body 18, the controller 5 generates the three types of reconstructed images (absorptive image, differential phase image, small angle scattering image) based on the received subject moire fringe image and the BG moire fringe image for generating the reconstructed image stored in the storage.

Specifically, first, the offset correction processing, the gain correction processing, the defective pixel correction processing, the X-ray strength change correction, etc. are performed on the subject moire fringe image. Next, based on the corrected subject moire fringe image and the BG moire fringe image for generating the reconstructed image, the three types of reconstructed images (transmissivity image, differential phase image, small angle scattering image) are generated. The absorptive image is generated by dividing the added image of the M subject moire fringe images by the added image of M BG moire fringe images to generate the transmissivity image and then performing logarithmic conversion on the generated transmissivity image. The differential phase image is generated by calculating the phase of the moire fringe using the principle of the fringe scanning method for each of the subject moire fringe images and the BG moire fringe images to generate the differential phase image with the subject and the differential phase image without the subject. Then, the generated differential phase image without the subject is subtracted from the generated differential phase image with the subject. The small angle scattering image is generated by calculating the visibility of the moire fringe using the principle of the fringe scanning method for each of the subject moire fringe images and the BG moire fringe image (Visibility=amplitude÷average value) to generate the small angle scattering image with the subject and the small angle scattering image without the subject. Then, the generated small angle scattering image with the subject is divided by the small angle scattering image without the subject (Reference Document 3; Timm Weitkamp, Ana Diazand, Christian David, Franz Pfeiffer, and Marco Stampanoni, Peter Cloetens, and Eric Ziegler, X-ray Phase Imaging with a grating interferometer, OPTIC-SEXPRESS, Vol. 13, No. 16, 6296-6004 (2005), Reference Document 4; Atsushi Momose, Wataru Yashiro, Yoshihiro Takeda, Yoshio Suzuki and Tadashi Hattori, Phase Tomography by X-ray Talbot Interferometry for Biological Imaging, Japanese Journal of Applied Physics, Vol. 45, No. 6A, 2006, pp. 5254-5262 (2006), Reference Document 5: F. Pfeiffer, M. Bech, O. Bunk, P. Kraft, E. F. Eikenberry, C H. Broennimann, C. Grunzweig, and C. David, Hard-X-ray dark-field imaging using a grating interferometer, nature materials Vol. 7, 134-137 (2008)).

(Verification Experiment of First Embodiment)

Described below is the result of the verification experiment verifying the subject moire fringe image generated in the low visibility capturing mode and the transmissivity image (absorptive image) generated based on the above moire fringe image according to the first embodiment.

In the verification experiment, a stack of 70 memo sheets is to be the scatterer 113, and the PMMA which is the same as in the capturing of the moire fringe images shown in FIG. 5 is to be the subject. The capturing is performed in the above-described low visibility capturing mode to obtain the subject moire fringe image. The transmissivity image is generated based on the generated subject moire fringe image.

The grating period and the distance between the gratings used in the verification experiment is the same as that described in the above-described apparatus specifications. The thickness of one memo sheet of the scatterer 113 is 50 to 60 μm, the thickness of 70 sheets is about 4 mm and the X-ray transmissivity of the scatterer 113 is 0.72. The visibility of the moire fringe is reduced to 0.05.

Figures 11A, 11B, 11C, 11D:
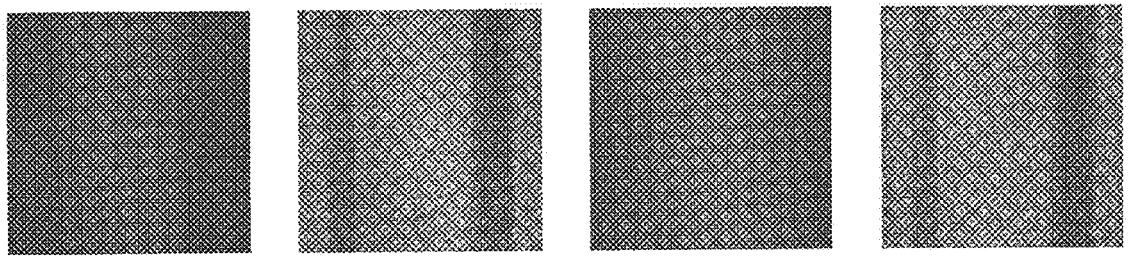
FIG. 11A is a subject moire fringe image obtained by positioning a scatterer in an irradiating field and capturing with a low visibility capturing mode.
FIG. 11B is a transmissivity image generated by dividing the subject moire fringe image shown in FIG. 11A by an added image of a BG moire fringe image for generating the reconstructed image and further dividing the result by the X-ray transmissivity of the scatterer.
FIG. 11C is a BG moire fringe image obtained by capturing with the low visibility capturing mode without positioning the subject.
FIG. 11D is a transmissivity image generated by dividing the subject moire fringe image shown in FIG. 11A by the BG moire fringe image shown in FIG. 11C.

FIG. 11A is a subject moire fringe image obtained by capturing in the above-described low visibility capturing mode with the scatterer 113 positioned in the irradiating field. Since the visibility of the moire fringe is 0.05, as shown in FIG. 11A, the strength change of about 5% can be seen according to the phase of the moire fringe (depending on the relative position of the multi-slit 12, the first grating 14, and the second grating 15 in the x-direction and the phase change in the subject). The strength change is smaller than the subject moire fringe image (see FIG. 5) before reducing the visibility of the moire fringe, and the image close to the added image of the subject moire fringe image as shown in FIG. 7 can be obtained.

FIG. 11B shows the transmissivity image generated by dividing the subject moire fringe image shown in FIG. 11A by the added image of the BG moire fringe image for generating the reconstructed image and further dividing the result by the X-ray transmissivity of the scatterer 113. Since the capturing of the BG moire fringe image for generating the reconstructed image is performed without inserting the scatterer 113, the amount absorbed by the scatterer 113 of the subject moire fringe image is corrected by dividing with the X-ray transmissivity.

FIG. 11C is the BG moire fringe image obtained by capturing in the above-described low visibility capturing mode without positioning the subject. FIG. 11D is the transmissivity image generated by dividing the subject moire fringe image shown in FIG. 11A by the BG moire fringe image of FIG. 11C.

As shown in FIG. 11B and FIG. 11D, the subject moire fringe image shown in FIG. 11A is divided by the BG moire fringe image to obtain the image which is generally stable as the transmissivity image.

As described above, by performing the capturing once with the scatterer 113 inserted in the irradiating field between the radiation source 11 and the radiation detector 16, the image with the visibility of the moire fringe reduced close to 0 can be obtained. Therefore, the absorptive image can be easily generated by one simple capturing similar to the conventional simple X-ray capturing apparatus without removing the grating from the field of view.

It is preferable that the visibility of the moire fringe is 0. However, with this, the absorption of the scatterer 113 becomes large. Depending on the purpose, the scatterer can be determined from the relation of tradeoff between the visibility of the moire fringe and the X-ray transmissivity as in the present experiment. For example, in the positioning of the subject, the relation of the position of the subject is to be confirmed, and there is no problem in the moire fringe remaining in a small amount. However, for the purpose of the defect map of the grating and collecting the calibration data of the apparatus such as the calibration data of the detector, the remaining moire fringe may be the cause for the false image in the actual capturing. Therefore, there is a need for the scatterer 113 which makes the visibility of the moire fringe to almost 0.

The position of the scatterer 113 may be anywhere between the radiation source 11 and the radiation detector 16. When it is necessary to reduce the irradiated amount on the subject for medical purposes, preferably, the scatterer 113 is positioned toward the radiation source 11 side than the subject. By positioning the scatterer 113 toward the radiation source 11 side than the subject, the radiation which passes through the subject is not absorbed by the scatterer 113, and the granularity with respect to the irradiated amount can be suppressed.

Figure 12A:
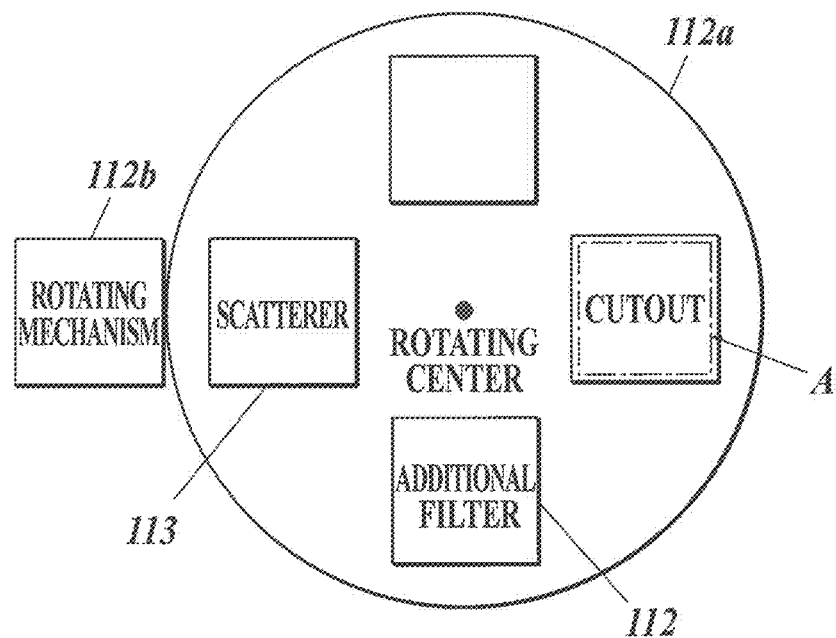
FIG. 12A is a diagram showing an example of withdrawing the scatterer from the irradiating field with a rotating mechanism.
Figure 12B:
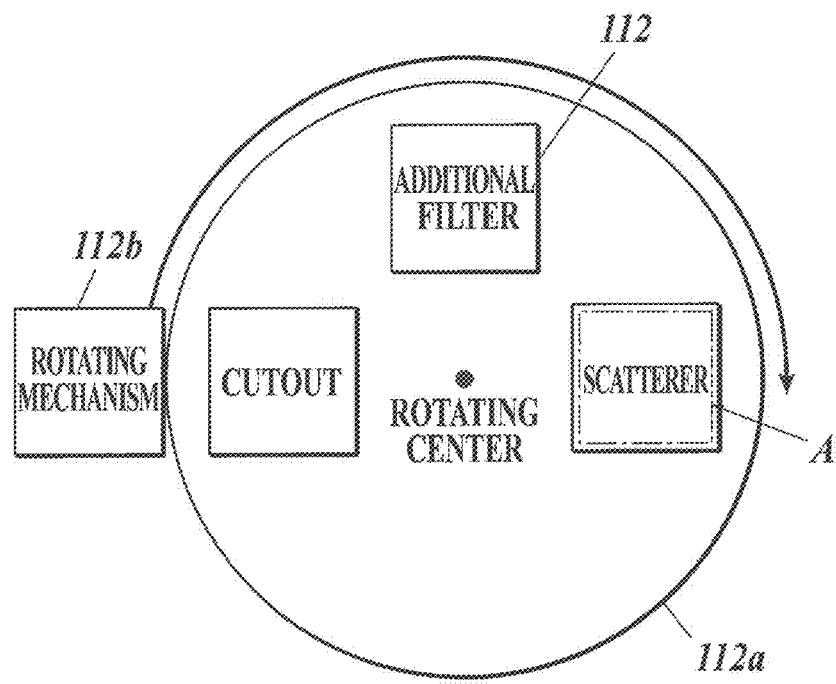
FIG. 12B is a diagram showing an example of inserting the scatterer in the irradiating field with the rotating mechanism.

As described above, the scatterer 113 can be inserted and withdrawn between the radiation source 11 and the radiation detector 16 by moving the scatterer 113 in the x-direction or the y-direction, but the present embodiment is not limited to such configuration. For example, as shown in FIG. 12A and FIG. 12B, the scatterer 113 is positioned on a turntable 112*a* which is the same as the additional filter/collimator 112. In the actual capturing mode, the scatterer 113 is withdrawn from the position of the irradiating field A by the rotating mechanism 112*b* as shown in FIG. 12A. In the low visibility capturing mode, the turntable 112*a* can be rotated by the rotating mechanism 112*b* to position the scatterer 113 in the position of the irradiating field A as shown in FIG. 12B.

Second Embodiment

The second embodiment of the present invention is described below.

According to the second embodiment, the moire fringe image with the reduced visibility of the moire fringe is obtained by capturing in a state in which one or more gratings among the three gratings which are the multi-slit 12, the first grating 14, and the second grating 15 is rotated around the radiation irradiating axis with respect to the grating position in the capturing by the fringe scanning state. The influence provided to the moire fringe is different depending on the rotated grating. First, the phenomenon which occurs by rotating each grating is described. Here, the phase of the moire fringe is determined by the relative angle of the three gratings. When the two gratings are rotated in the same direction in the same angle, it is the same effect as rotating the grating which is not rotated in the opposite direction in the same angle.

The grating position suitable for capturing by the fringe scanning method is when the slit period direction of the three gratings is parallel in the x-direction. The relative angle of the three gratings is 0 degrees.

First, rotating the multi-slit 12 around the radiation irradiating axis is described.

As described above, it is known that the opening (slit) of the multi-slit 12 functions as a virtual light source. According to the present embodiment, when the multi-slit 12 is a one-dimensional grating, it is necessary to determine the period of the multi-slit 12 so that the own-image formed for each slit of the multi-slit 12 overlaps on the second grating 15. Such period $d_0$ of the multi-slit 12 can be obtained by the following formula (formula 5).

$$d_0 = d_2 R_1/(R_2 - R_1) \quad \text{(formula 5)}$$

The self-images formed with the different slits overlap according to the relation shown in the above (formula 5) but the slit period structures of the multi-slit 12 and the first grating 14 need to be parallel. When the slit period structures are not parallel, the self-image is shifted in the x-direction and added according to the size of the focal diameter of the radiation source 11 and the angle, and the visibility of the moire fringe reduces. The present inventors found that when the relative angle of the multi slit 12 with respect to the other gratings becomes $\Delta\theta_0$ shown in (formula 6) as described below, the phase of the self-image in the focal point edge is overlapped shifted $\pi$ from the phase of the self-image in the focal point center, and the visibility of the moire fringe becomes almost the minimum value.

$$\Delta\theta_0 = \tan^{-1}(d_0(R_0+R_2)/(\Sigma_r R_2)) \quad \text{(formula 6)}$$

The visibility of the moire fringe depends on the strength distribution of the focal point. Therefore, if the strict minimum value of the relative angle $\Delta\theta_0$ is desired, the self-image weighted according to the strength distribution of the focal point is added and the angle in which the visibility becomes the minimum value is obtained.

Next, the rotating of the second grating 15 around the radiation irradiating axis is described.

It is known that when the second grating 15 is rotated around the radiation irradiating axis, as described in Japanese Patent No. 4445397, the period of the moire fringe changes. When the period of the moire fringe is the same as the pixel size of the radiation detector 16, the moire fringe for one period is averaged by the pixel and the visibility of the moire fringe becomes 0. The relative angle $\Delta\theta_2$ of the second grating 15 in which the period of the moire fringe and the pixel size in the y-direction becomes the same can be obtained by the following (formula 7).

$$\Delta\theta_2 = \tan^{-1}(d_2 R_d/(\det \cdot R_2)) \quad \text{(formula 7)}$$

Here, det is the pixel size in the y-direction. Since the blur occurs according to the MTF (Modulation Transfer Function) of the radiation detector 16 even when the period of the moire fringe is larger than one pixel of the radiation detector 16, the visibility of the moire fringe reduces according to the frequency of the moire fringe and the MTF. Therefore, even if the period of the moire fringe is not the same as the pixel size of the radiation detector 16, if it is almost the same, the visibility of the moire fringe becomes almost 0 but the beat occurs due to the aliasing.

Rotating the first grating 14 around the radiation irradiating axis is the same as rotating the multi-slit 12 and the second grating 15 with respect to the first grating 14 in the same angle. That is, rotating the first grating 14 around the radiation irradiating axis has the combined effect of rotating the multi-slit 12 and the second grating 15.

FIG. 13 is a schematic diagram showing a relation between the rotating of the multi-slit 12 (G0), the first grating 14 (G1), and the second grating 15 (G2) around the radiation irradiating axis and the moire fringe visibility.

The $\Delta\theta_0$ and the $\Delta\theta_2$ calculated with the conditions shown in the above-described apparatus specifications are each 3.42 degrees, 3.59 degrees, respectively.

According to the second embodiment, in the low visibility capturing mode, one or a plurality of gratings among the three gratings are rotated around the radiation irradiating axis with respect to the grating position in the capturing by the fringe scanning mode to perform one capturing. Preferably, the rotating angle $\Delta\theta$ is represented by the following, $\Delta\theta_0$ when the multi-slit 12 is rotated, $\Delta\theta_2$ when the second grating 15 is rotated, and $\Delta\theta_0$ or $\Delta\theta_2$ when the first grating 14 is rotated.

When the radiation detector 16 is used as the slit scintillator detector, the slit scintillator detector is rotated around the radiation irradiating axis instead of the second grating 15. When the slit scintillator detector is used, calculation of $\Delta\theta_2$ is performed with Rd=R2.

Figure 14:
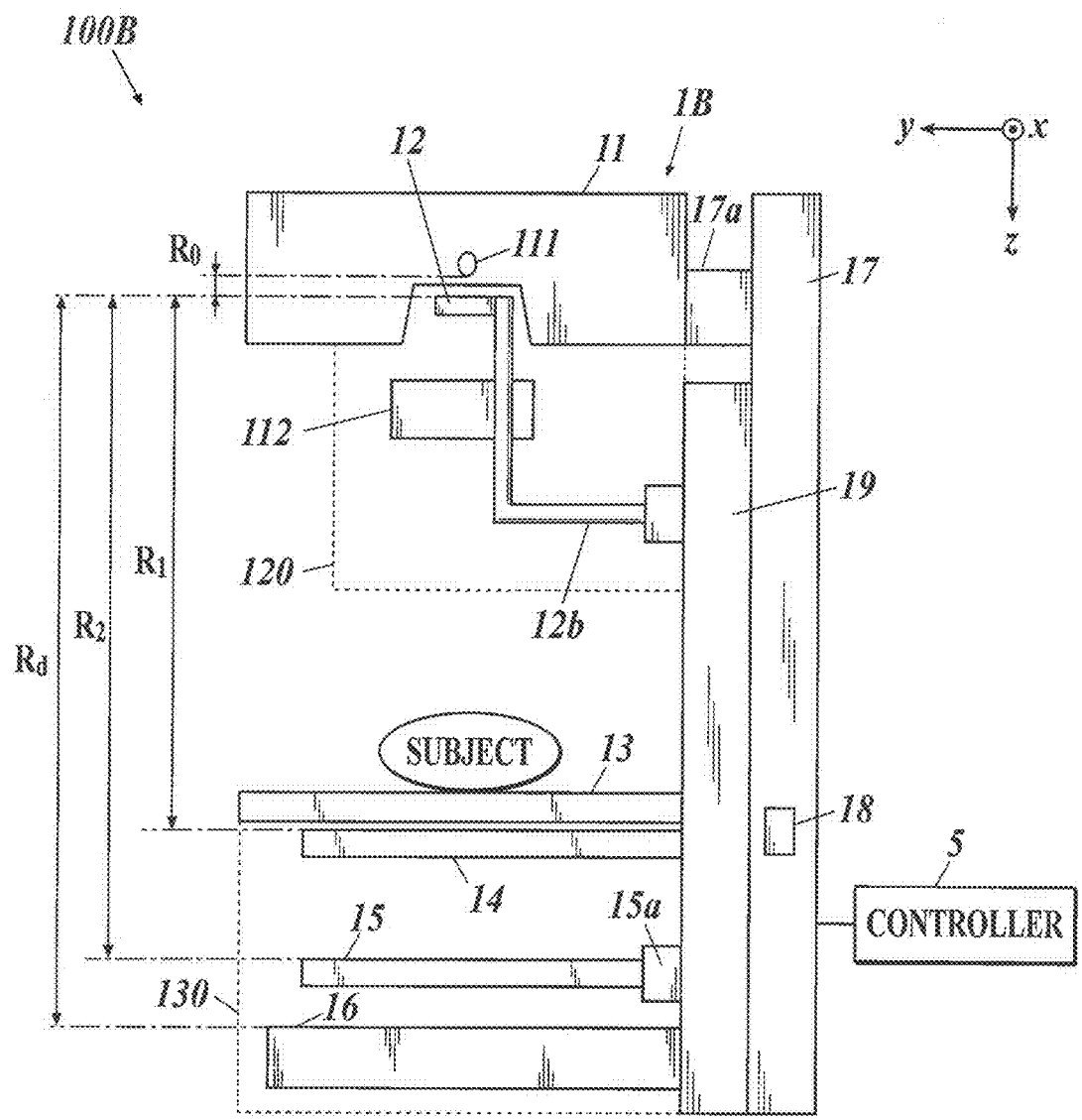
FIG. 14 is a diagram showing an example of a configuration of a radiation capturing system according to the second embodiment.
Figure 15:
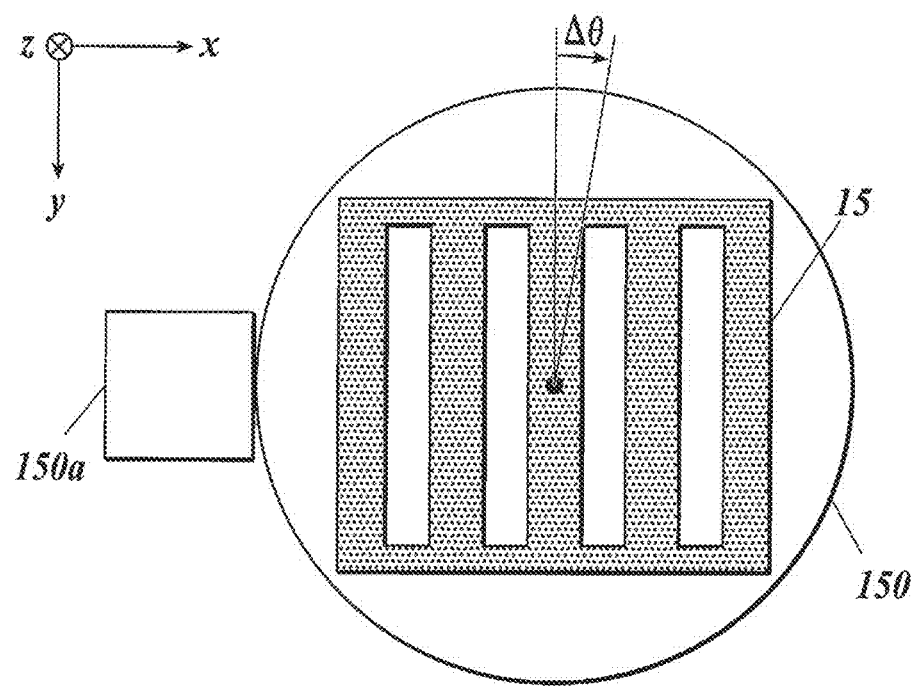
FIG. 15 is a diagram showing an example of a mechanism to rotate the grating around the radiation irradiating axis.

FIG. 14 shows the configuration example of the radiation capturing system 100B of the second embodiment. As shown in FIG. 14, the radiation capturing system 100B includes the radiation capturing apparatus 1B and the controller 5. The radiation capturing apparatus 1B includes a configuration to rotate one or a plurality of gratings among the three gratings which are the multi-slit 12, the first grating 14, and the second grating 15 around the radiation irradiating axis. For example, as shown in FIG. 15, a configuration in which the radiation capturing apparatus 1B includes a turntable 150 with the radiation irradiating axis as the rotating axis and with an opening to fit the grating in the center portion, and the turn table 150 is rotated by the rotating mechanism 150a can be used as the configuration to rotate one or a plurality of gratings among the three gratings around the radiation irradiating axis. According to FIG. 15 and the description below, the radiation capturing apparatus 1B includes a configuration to rotate the second grating 15, but the configuration is not limited to the above. The moving mechanism 15a which moves the second grating 15 in the x-direction moves the turntable 150 which holds the second grating 15 in the x-direction. When the slit period direction of the second grating 15 is the x-direction, the rotating angle of the turntable 150 is 0 degrees. Here, the slit period direction matches with the other gratings and the relative angle is 0 degrees. The relative angle is 0 in the grating position in capturing by the fringe scanning method. In the radiation capturing apparatus 1B, the scatterer 113 and the moving mechanism 113a described in the first embodiment are not necessary.

The configuration of the other units in the radiation capturing apparatus 1B and the controller 5 are similar to the description in the first embodiment, and are applied for reference.

Next, the capturing operation in the radiation capturing apparatus 1B and the image generating operation in the controller 5 according to the second embodiment are described.

Figure 16:
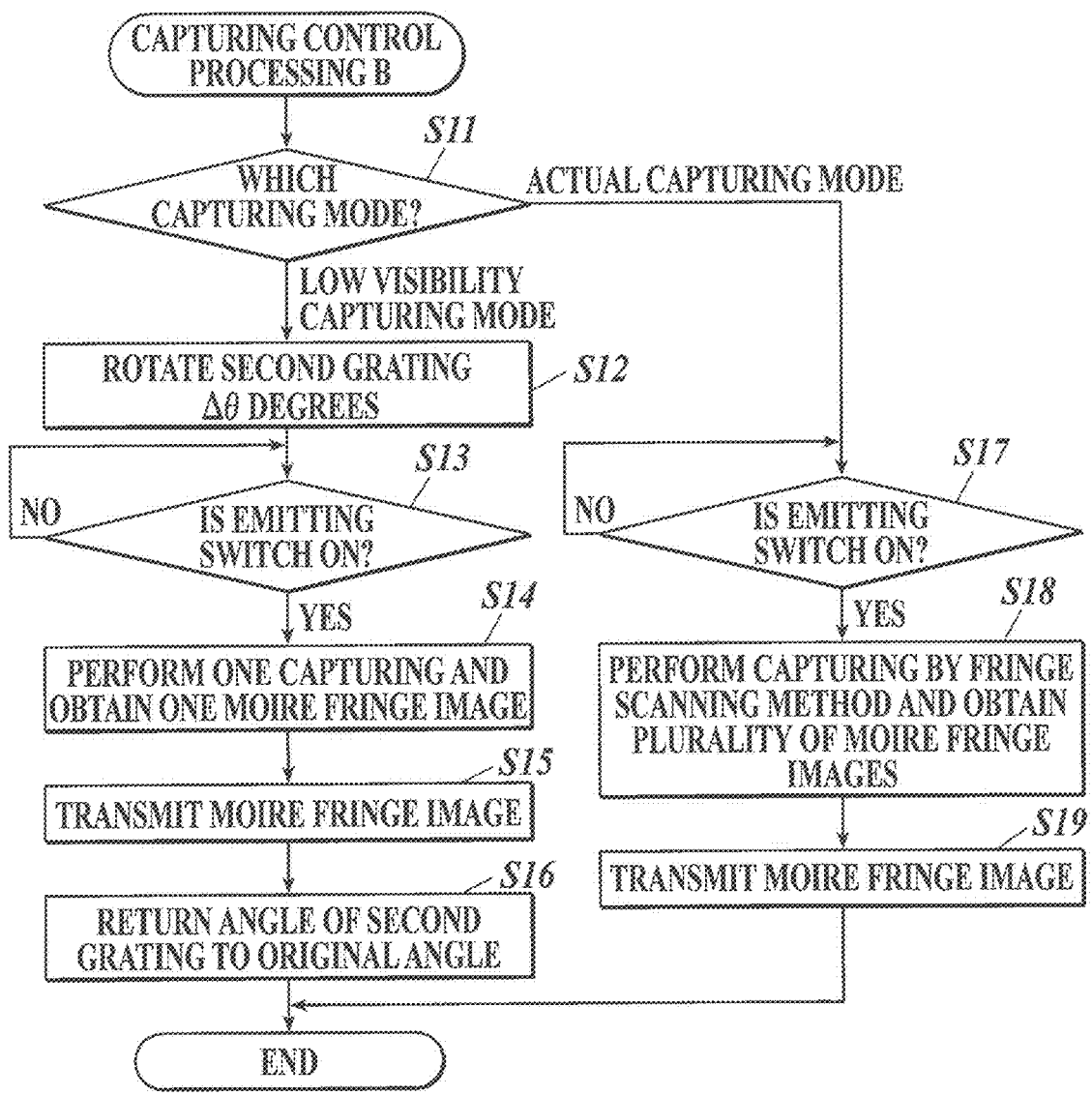
FIG. 16 is a flowchart showing capturing control processing B performed by the radiation capturing apparatus according to the second embodiment.

FIG. 16 shows the flowchart of the capturing control processing B performed by the controller 181 of the radiation capturing apparatus 1B. The capturing control processing B is performed by the controller 181 in coordination with the program stored in the storage 185.

First, the controller 181 determines whether the capturing mode is the low visibility capturing mode or the actual capturing mode (step S11).

When it is determined that the capturing mode is the low visibility capturing mode (step S11; low visibility capturing mode), the controller 181 controls the rotating mechanism 150a and rotates the second grating 15 $\Delta\theta$ degrees (for example, $\Delta\theta_2$ degrees) (step S12).

Next, the controller 181 stands by for the emitting switch of the operating unit 182 to be turned ON by the operator (step S13). When the emitting switch of the operating unit 182 is turned ON (step S13; YES), the controller 181 controls the radiation source 11 and the radiation detector 16 and performs one capturing without moving the second grating 15 to obtain one moire fringe image (step S14). The specific processing of step S14 is the same as the description for step S4 and the same description is to be referred.

Then, the controller 181 uses the communicating unit 184 to transmit the moire fringe image to the controller 5 (step S15). The controller 181 controls the rotating mechanism 150a to return the rotating angle of the second grating 15 to the original position (step S16) and the capturing control processing B ends.

When it is determined that the capturing mode is the actual capturing mode (step S11; actual capturing mode), the controller 181 stands by for the emitting switch of the operating unit 182 to be turned ON by the operator (step S17). When the emitting switch of the operating unit 182 is turned ON (step S17; YES), the controller 181 controls the radiation source 11, the radiation detector 16, and the moving mechanism 15a and performs a plurality of steps (M steps) of capturing with the fringe scanning method and obtains the plurality of moire fringe images (M images) (step S18).

Then, the controller 181 uses the communicating unit 184 to transmit the moire fringe image to the controller 5 (step S19), and ends the capturing control processing B.

When the controller 5 receives the subject moire fringe image generated in the low visibility capturing mode from the main body 18, the controller 5 generates the absorptive image and displays on the display the generated absorptive image. The process of generating the absorptive image in the controller 5 is the same as in the first embodiment and the description is to be referred.

When the controller 5 receives the string of subject moire fringe images and the BG moire fringe images generated in the actual capturing mode from the main body 18, the controller 5 generates the three types of reconstructed images (absorptive image, differential phase image, small angle scattering image) based on the received moire fringe image, and displays the above on the display. The process of generating the reconstructed image in the controller 5 is the same as in the first embodiment and the description is to be referred.

(Verification Experiment of Second Embodiment)

Described below is the result of the verification experiment verifying the subject moire fringe image generated in the low visibility capturing mode and the transmissivity image (absorptive image) generated based on the moire fringe image according to the second embodiment.

In the verification experiment, the PMMA which is the same as in the capturing of the moire fringe images shown in FIG. 5 is to be the subject. The capturing is performed in the low visibility capturing mode as described in the second embodiment, and the subject moire fringe image is obtained. The transmissivity image is generated based on the generated subject moire fringe image.

The period of the grating and the distance between the gratings used in the verification experiment are described in the above-described apparatus specifications. The rotating angle $\Delta\theta$ of the second grating is 3.59 degrees obtained from the calculating result of (formula 6). The visibility of the moire fringe is reduced to 0.02.

Figures 17A, 17B, 17C, 17D:
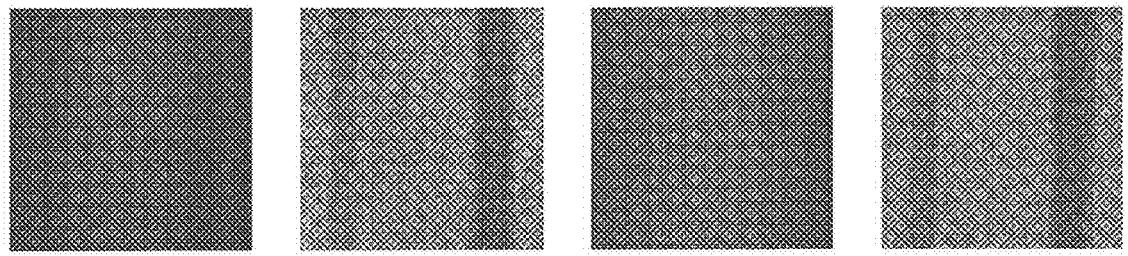
FIG. 17A is a subject moire fringe image obtained by rotating the second grating around the radiation irradiating axis 3.59 degrees and capturing with the low visibility capturing mode.
FIG. 17B is a transmissivity image generated by dividing the subject moire fringe image shown in FIG. 17A by the added image of the BG moire fringe image (Δθ=0 degrees) for generating the reconstructed image.
FIG. 17C is a BG moire fringe image captured by rotating the second grating 3.59 degrees.
FIG. 17D is a transmissivity image generated by dividing the subject moire fringe image shown in FIG. 17A by the BG moire fringe image captured by rotating the second grating 15 by 3.59 degrees.

FIG. 17A is a subject moire fringe image obtained by rotating the second grating 15 around the radiation irradiating axis 3.59 degrees and performing capturing with the above-described low visibility mode. Most of the moire fringes are gone and an image close to FIG. 7A is obtained. Since the period of the moire fringe and the pixel size do not completely match, beat due to aliasing slightly occurs. Even if the period of the moire fringe and the pixel size completely match, it is difficult to manufacture the period configuration of the grating perfectly, and it is assumed that the beat due to aliasing occurs in some portions.

FIG. 17B is a transmissivity image generated by dividing the subject moire fringe image shown in FIG. 17A by the added image of the BG moire fringe image ($\Delta\theta=0$ degrees) for generating the reconstructed image. When the subject moire fringe image is divided by the added image of the BG moire fringe image ($\Delta\theta=0$ degrees) for generating the reconstructed image, as shown in FIG. 17B, the absorption unevenness and the defect of the grating which is not rotated in capturing of the subject moire fringe image and the sensitivity unevenness of the detector can be corrected. However, the beat due to aliasing cannot be corrected. The defects of the rotated grating appear as false images of white spots and black spots. There is the merit that the grating does not need to be rotated in the same angle as in the subject moire fringe image and the BG moire fringe image does not have to be captured (held).

FIG. 17D is a transmissivity image generated by dividing the moire fringe image shown in FIG. 17A by the BG moire fringe (FIG. 17C) image captured by rotating the second grating 15 3.59 degrees. By dividing the relative angle of the grating by the BG moire fringe image which is the same as in the capturing of the subject moire fringe image, the generating of the beat is suppressed, and all of the absorption unevenness and the defect of the grating and the sensitivity unevenness of the detector are corrected together.

According to the above verification experiment, rotating the second grating 15 $\Delta\theta$ degrees around the radiation irradiating axis is described. As described above, a similar effect can be obtained by rotating the other gratings and the plurality of gratings $\Delta\theta$ degrees around the radiation irradiating axis.

As described above, when capturing is performed once by rotating one or a plurality of gratings among the three gratings which are the multi-slit 12, the first grating 14, and the second grating 15 around the radiation irradiating axis with respect to the grating position in capturing by the fringe scanning line, an image with the visibility of the moire fringe reduced to almost 0 can be obtained. Therefore, the absorptive image can be generated easily by one simple capturing as in the conventional simple X-ray capturing apparatus without removing the grating from the field of view.

According to the present experiment, the value obtained from calculating the rotating angle of the second grating 15 is used. Considering the manufacturing error and the adjustment error of the grating, preferably, the rotating angle in which the visibility of the moire fringe becomes smallest is obtained in advance by experiments, and such value is used. Moreover, the "around the radiation irradiating axis" which is the rotating direction of the grating is to substantially match with the radiation irradiating axis and includes when it is slightly shifted.

Third Embodiment

Described below is the third embodiment of the present invention.

According to the example described in the third embodiment, one or plurality of the gratings among the multi-slit 12, the first grating 14, the second grating 15 is moved in the radiation irradiating direction (z-direction) with respect to the grating position in capturing by the fringe scanning method and the capturing is performed to obtain the moire fringe image with the visibility of the moire fringe reduced.

As described above, it is required that the moire fringe is visible in the capturing by the fringe scanning method. Therefore, there is a predetermined position (design position) according to the design of the interferometer for the positions of the three gratings in the z-direction. If the radiation absorption of the shielding portion of the multi-slit 12 and the second grating 15 is sufficient, the visibility of the moire fringe in the design position becomes largest. When one or a plurality of gratings are moved in the z-direction from this state, two effects of reducing the moire fringe visibility can be obtained. The first effect is to reduce the visibility when the self-image formed for each slit of the multi-slit 12 is added by shifting on the grating face of the second grating 15 in the x-direction. The second effect is to reduce the visibility according to the MTF of the radiation detector 16 caused by the period of the moire fringe becoming thin due to the period of the self-image by the first grating 14 and the period of the second grating 15 not matching. Although the direction that the moire fringe is generated is different from when the visibility reduction of the moire fringe occurs by the rotation of the first grating 14 around the radiation irradiating axis as described in the second embodiment, the two reduction effects occur due to the difference between the periods of the self-image and the second grating 15, and the difference in the overlapping due to the multi-slit 12. The amount that the visibility of the moire fringe is reduced with respect to the moving amount in the z-direction is different depending on each of the three gratings, but the visibility reduces due to the combination of the above two effects regardless of which grating is moved.

Figure 18:
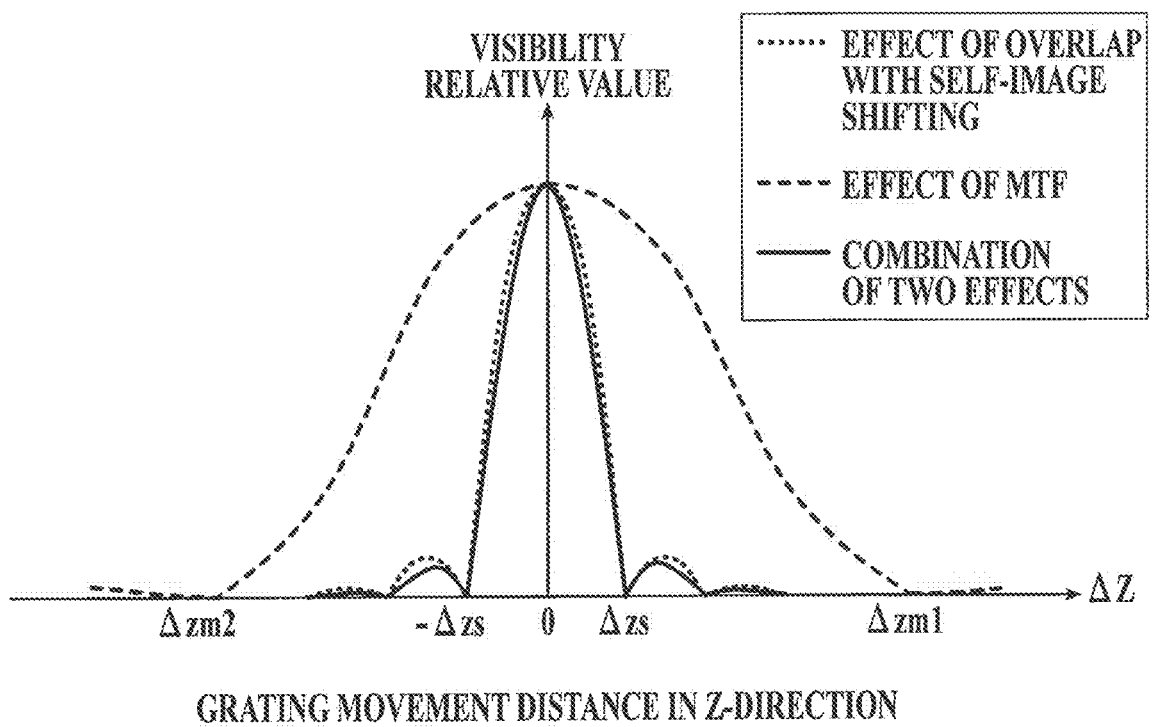
FIG. 18 is a schematic diagram showing a relation between movement of the grating in a z-direction and visibility of the moire fringe.

FIG. 18 shows the schematic diagram showing the relation between the movement of the grating in the z-direction and the visibility of the moire fringe.

$\Delta z_s$ shown in FIG. 18 is the moving amount when the visibility of the moire fringe becomes 0 for the first time due to the self-image by the slit of the multi-slit 12 shifting by overlapping on the second grating 15. When the second grating 15 is moved in the z-direction, an approximate $\Delta z_s$ can be calculated by the following (formula 8).

$$\Delta z_s = d_2(R_0+R_2)/(\Sigma_x) \quad \text{(formula 8)}$$

$\Delta zm_1$, $\Delta zm_2$ show the moving amount in which the period of the moire fringe becomes the same as the pixel size of the radiation detector 16. The change of the moire fringe period is different depending on the moving direction. The moving amount to the radiation detector 16 side is to be $\Delta zm_1$, and the moving amount to the radiation source 11 side is to be $\Delta zm_2$. When the second grating 15 is moved in the z-direction, an approximate $\Delta zm_1$ and $\Delta zm_2$ can be calculated by the following (formula 9).

$$\Delta z_{m1} = d_2(R_0+R_2)/(d_2-\det)$$

$$\Delta z_{m2} = d_2(R_0+R_2)/(d_2+\det) \quad \text{(formula 9)}$$

As for the movement of the multi-slit 12 and the first grating 14 in the z-direction, the approximate value of $\Delta z_s$, $\Delta zm_1$, $\Delta zm_2$ can be obtained from the relation among the focal diameter, the slit period, the distance between the gratings, and the pixel size of the detector.

In the low visibility capturing mode of the third embodiment, one or a plurality of the three gratings is moved in the z-direction with respect to the grating position in the capturing by the fringe scanning method and the capturing is performed.

Figure 19:
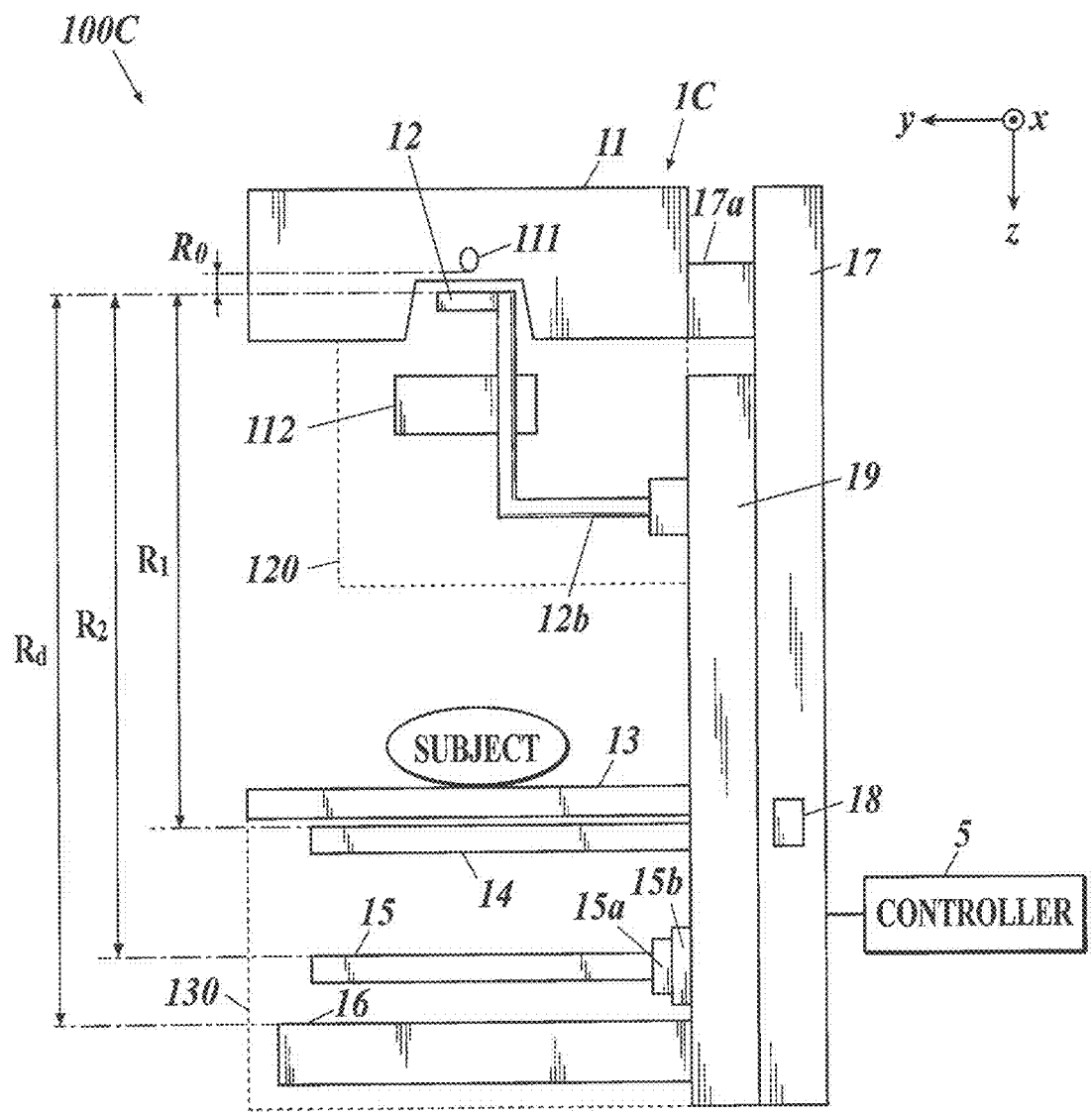
FIG. 19 is a diagram showing an example of a configuration of a radiation capturing system according to the third embodiment.

FIG. 19 shows the configuration example of the radiation capturing system 100C in the third embodiment. As shown in FIG. 19, the radiation capturing system 100C includes the radiation capturing apparatus 1C and the controller 5. The radiation capturing apparatus 1C includes the configuration to move one or a plurality of the gratings among the three gratings which are the multi-slit 12, the first grating 14, and the second grating 15 in the z-direction. FIG. 18 shows only the moving mechanism 15b to move the second grating 15 in the z-direction. Described below is the example moving the second grating 15 in the z-direction. Alternatively, the moving mechanism to move the multi-slit 12 and the first grating 14 in the z-direction can be provided and the above gratings can be moved in the z-direction. According to the radiation capturing apparatus 1C, the scatterer 113 and the moving mechanism 113a described in the first embodiment are not necessary.

The configuration of the other units of the radiation capturing apparatus 1C and the controller 5 are the same as in the first embodiment, and the description is to be referred.

Next, the capturing operation in the radiation capturing apparatus 1C and the image generating operation in the controller 5 are described.

Figure 20:
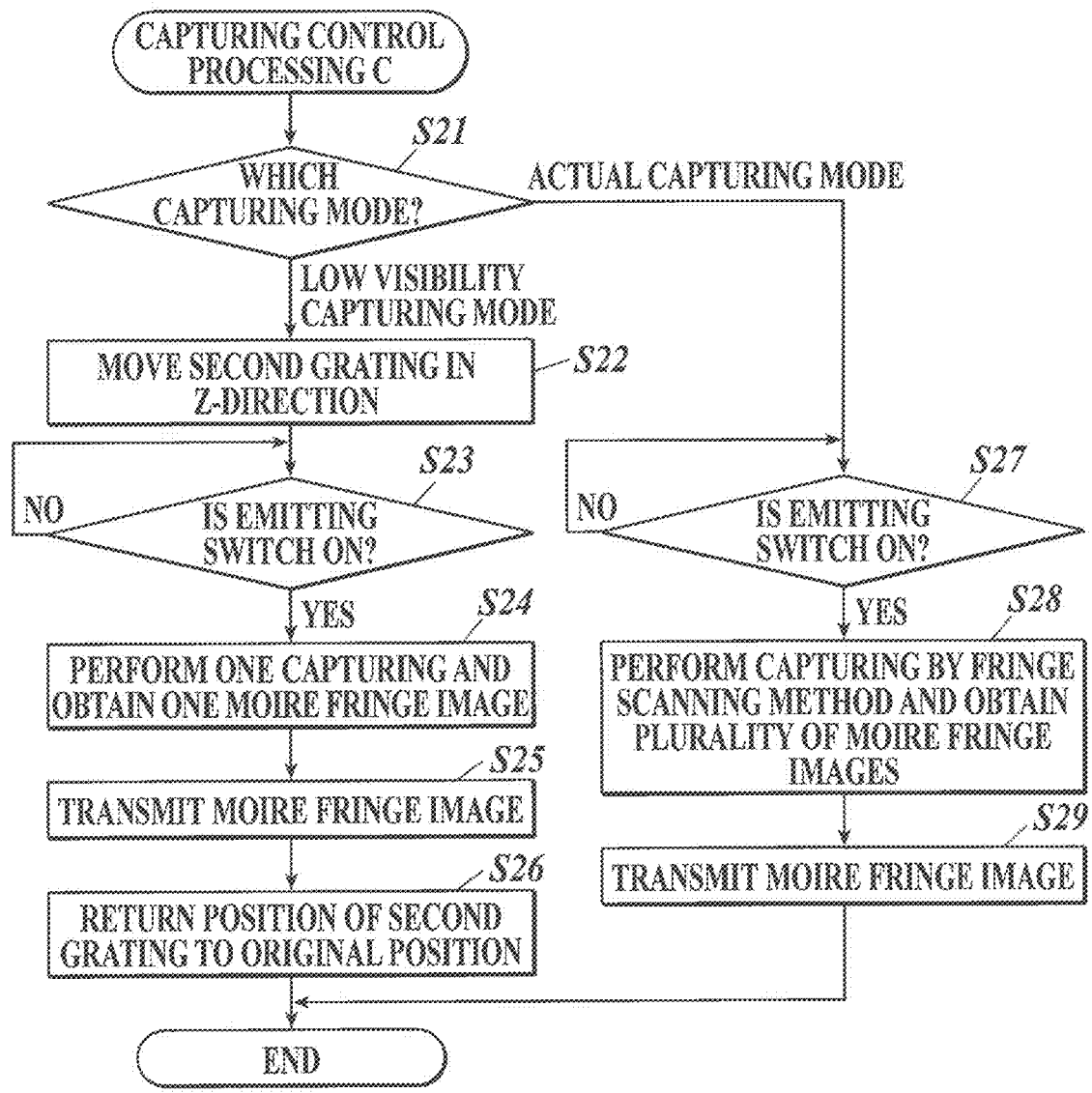
FIG. 20 is a flowchart showing a capturing control processing C performed by the radiation capturing apparatus according to the third embodiment.

FIG. 20 shows the flowchart of the capturing control processing C performed by the controller 181 of the radiation capturing apparatus 1C. The capturing control processing C is performed by the controller 181 in coordination with the program stored in the storage 185.

First, the controller 181 determines whether the capturing mode is the low visibility capturing mode or the actual capturing mode (step S21).

When it is determined that the capturing mode is the low visibility capturing mode (step S21; low visibility capturing mode), the controller 181 controls the moving mechanism 15b to move the second grating 15 a predetermined distance (for example, $\Delta zs$, $\Delta zm_1$ or $\Delta zm_2$) in the z-direction from the position in the capturing by the fringe scanning method (step S22).

Next, the controller 181 stands by for the emitting switch of the operating unit 182 to be turned ON by the operator (step S23). When the emitting switch of the operating unit 182 is turned ON (step S23; YES), the controller 181 controls the radiation source 11 and the radiation detector 16 and performs one capturing without moving the multi-slit 12 to obtain one moire fringe image (step S24). The specific processing in step S14 is the same as step S4, and the description is to be referred.

Then, the controller 181 uses the communicating unit 184 to transmit the moire fringe image to the controller 5 (step S25), controls the moving mechanism 15b to return the second grating 15 to the position for actual capturing by the fringe scanning method (step S26), and ends the capturing control processing C.

When the capturing mode is determined to be the actual capturing mode (step S21; actual capturing mode), the controller 181 stands by for the emitting switch of the operating unit 182 to be turned ON by the operator (step S27). When the emitting switch of the operating unit 182 is turned ON (step S27; YES), the controller 181 controls the radiation source 11, the radiation detector 16, and the moving mechanism 15a and performs a plurality of steps (M steps) of capturing by the fringe scanning method to obtain a plurality of moire fringe images (M images) (step S28).

Then, the controller 181 uses the communicating unit 184 to transmit the moire fringe image to the controller 5 (step S29), and ends the capturing control processing C.

When the controller 5 receives the subject moire fringe image generated in the low visibility capturing mode from the main body 18, the absorptive image is generated and the generated absorptive image is displayed on the display. The processing of generating the absorptive image in the controller 5 is the same as the description in the first embodiment, and the description is to be referred.

When the controller 5 receives the series of subject moire fringe images generated in the actual capturing mode from the main body 18, the controller 5 generates the three types of reconstructed images (absorptive image, differential phase image, small angle scattering image) based on the received moire fringe images and displays the images on the display. The processing of generating the reconstructed images in the controller 5 is the same as the description in the first embodiment, and the description is to be referred.

(Verification Experiment of Third Embodiment)

Described below is the result of the verification experiment verifying the subject moire fringe image generated in the low visibility capturing mode and the transmissivity image (absorptive image) generated based on the moire fringe image according to the third embodiment.

In the verification experiment, the PMMA which is the same as in the capturing of the moire fringe images shown in FIG. 5 is to be the subject. The capturing is performed in the low visibility capturing mode as described in the third embodiment, and the subject moire fringe image is obtained. The transmissivity image is generated based on the generated subject moire fringe image.

The period of the grating and the distance between the gratings used in the verification experiment are described in the above-described apparatus specifications. In the verification experiment, the second grating 15 is moved $\Delta z_s$ toward the radiation source 11 side. $\Delta z_s$ is set to 20 mm by rounding off 20.47 mm calculated from the calculating result of the (formula 8). The visibility of the moire fringe is reduced to 0.04.

Figures 21A, 21B, 21C, 21D:
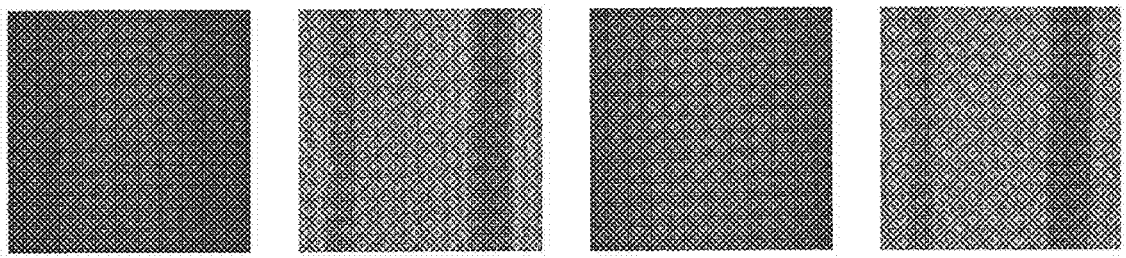
FIG. 21A is a subject moire fringe image obtained by capturing with the low visibility capturing mode moving the second grating 20 mm to the radiation source side from the position when captured by the fringe scanning method.
FIG. 21B is a transmissivity image generated by dividing the moire fringe image shown in FIG. 21A by the added image of the BG moire fringe image for generating the reconstructed image.
FIG. 21C is a BG moire fringe image obtained by capturing without positioning the subject with the low visibility capturing mode moving the second grating 20 mm to the radiation source side from the position in capturing by the fringe scanning method.
FIG. 21D is a transmissivity image generated by dividing the moire fringe image shown in FIG. 21A by the BG moire fringe image shown in FIG. 21C.

FIG. 21A is a subject moire fringe image obtained by moving the second grating 15 20 mm toward the radiation source 11 side from the position in capturing by the fringe scanning method, and capturing with the above-described low visibility mode. As shown in FIG. 21A, although fine moire fringes remain in the vertical direction, an image close to the moire fringe image shown in FIG. 7A is obtained.

FIG. 21B is a transmissivity image generated by dividing the moire fringe image shown in FIG. 21A by the added image of the BG moire fringe image for generating the reconstructed image. When the moire fringe image shown in FIG. 21A is divided by the added BG moire fringe image for generating the reconstructed image, as shown in FIG. 21B, the transmissivity image is obtained with the absorption unevenness and the defect of the grating which is not moved and the sensitivity unevenness of the detector corrected. However, the fine moire fringes are not corrected and the defects of the moved grating appear as false images of white spots and black spots. Since the BG moire fringe image stored in the controller 5 in advance is used, there is the merit that the grating does not need to be moved in the z-direction and the BG moire fringe image does not have to be captured (held).

FIG. 21C is a BG moire fringe image obtained by capturing in the above-described low visibility mode by moving the second grating 15 20 mm toward the radiation source 11 side from the position of capturing by the fringe scanning method without positioning the subject. FIG. 21D is a transmissivity image generated by dividing the moire fringe image shown in FIG. 21A by the BG moire fringe image of FIG. 21C. As shown in FIG. 21D, by dividing the moire fringe image with the subject by the BG moire fringe image captured in the same grating position, the fine moire fringe is suppressed, and an image is obtained with all of the absorption unevenness and the defect of the grating and the sensitivity unevenness of the detector corrected together.

The above verification experiment shows the second grating 15 moved $\Delta z_s$ toward the radiation source 11 side. As described above, a similar effect can be obtained when the other gratings or a plurality of gratings are moved in the z-direction.

As described above, since one capturing is performed with one or a plurality of gratings among the three gratings which are the multi-slit 12, the first grating 14, and the second grating 15 moved in the z-direction with respect to the grating position in capturing by the fringe scanning method, an image can be obtained with the visibility of the moire fringe reduced close to 0. Therefore, the absorptive image can be generated easily by one simple capturing as in the conventional simple X-ray capturing apparatus without removing the grating from the field of view.

The present experiment is described using the value calculated from the moving amount of the second grating 15 in the z-direction. Considering the manufacturing error and the adjustment error of the grating, preferably, the moving amount in which the visibility of the moire fringe becomes smallest is obtained in advance by experiments, and such value is used.

Figure 22A:
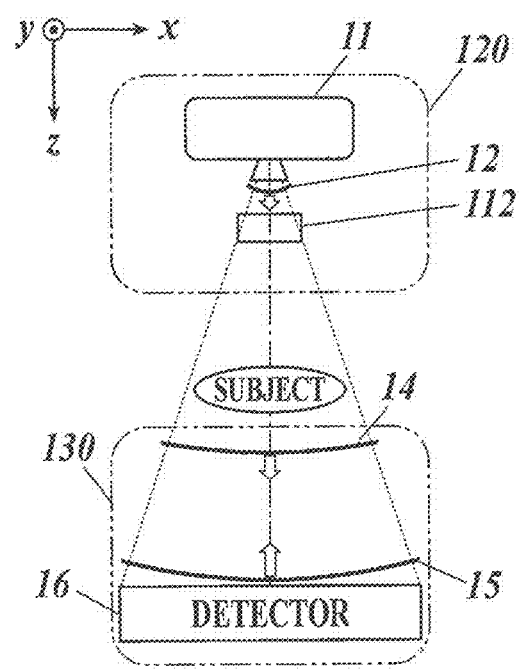
FIG. 22A is a diagram showing a case in which the gratings can be easily moved in a radiation capturing apparatus which irradiates radiation to the subject from an upper direction.
Figure 22B:
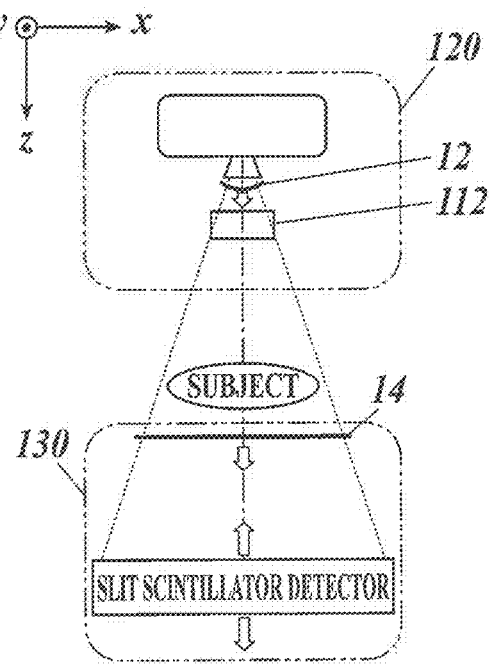
FIG. 22B is a diagram showing a case in which the gratings can be easily moved in a radiation capturing apparatus which irradiates radiation to the subject from an upper direction and which uses a slit scintillator detector including the function of the second grating and the radiation detector.
Figure 22C:
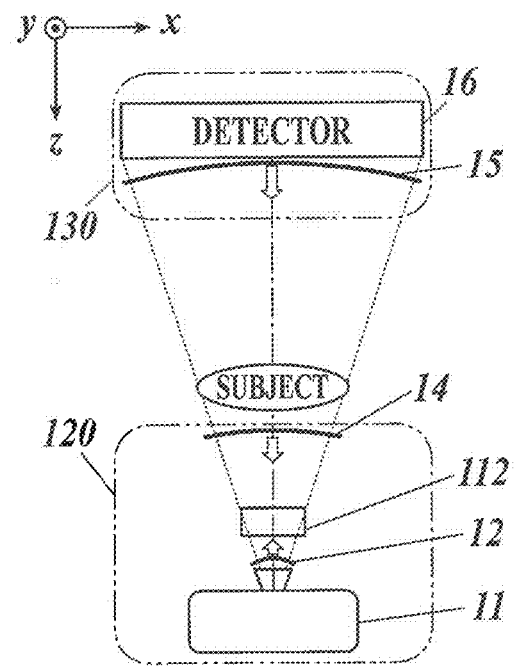
FIG. 22C is a diagram showing a case in which the gratings can be easily moved in a radiation capturing apparatus which irradiates radiation to the subject from a lower direction.
Figure 22D:
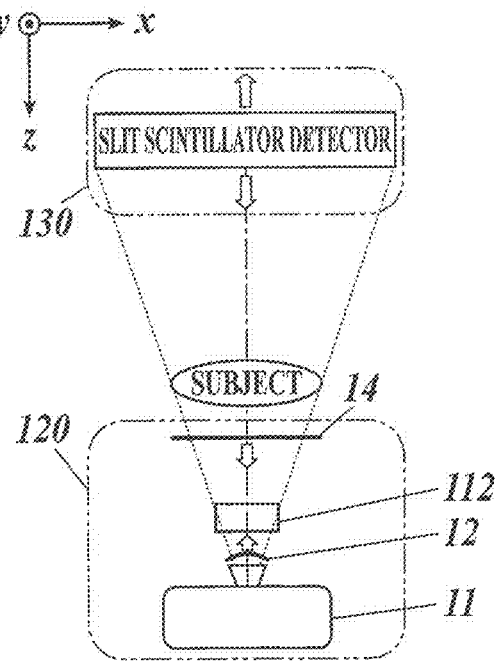
FIG. 22D is a diagram showing a case in which the gratings can be easily moved in a radiation capturing apparatus which irradiates radiation to the subject from a lower direction and which uses a slit scintillator detector including the function of the second grating and the radiation detector.

According to the third embodiment, moving the second grating 15 in the z-direction is described. As described above, any of the multi-slit 12, the first grating 14, and the second grating 15 can be moved in the z-direction. This may interfere with the radiation detector 16 or the case. Therefore, FIG. 22A to FIG. 22B show arrows pointing directions to which the gratings can be easily moved for each configuration of the apparatus. FIG. 22A is an example of the radiation capturing apparatus which emits the radiation to the subject from the upper direction. FIG. 22B is an example of an apparatus which is a radiation capturing apparatus which emits radiation to the subject from the upper direction and which uses the slit scintillator detector including the function of the second grating 15 and the radiation detector 16. FIG. 22C is the example of the capturing apparatus which irradiates radiation to the subject from the lower direction. FIG. 22D is an example of an apparatus which is a radiation capturing apparatus which emits radiation to the subject from the lower direction and which uses the slit scintillator detector including the function of the second grating 15 and the radiation detector 16.

The "radiation irradiating axis direction (z-direction)" which is the moving direction of the grating is to substantially match with the radiation irradiating direction and slight shifts are included.

Fourth Embodiment

The fourth embodiment of the present invention is described below.

According to the example described in the fourth embodiment, one or a plurality of gratings among the multi-slit 12, the first grating 14, and the second grating 15 are continuously moved in the x-direction which is the slit period direction during capturing, and the moire fringe image with the visibility of the moire fringe reduced is obtained.

When the capturing is performed while the one or the plurality of gratings are continuously moved equal to or an integral multiplication of the slit period of the grating in the x-direction, the same effect as adding the plurality of steps of the moire fringe images obtained by capturing by the fringe scanning method is obtained, and the visibility of the moire fringe image becomes 0 by theory. However, the grating needs to be moved at the speed of dividing the x-direction moving amount of the grating by the data collecting time (radiation irradiating term and charge accumulating term). Therefore, the speed that the grating is moved needs to be changed according to the data collecting time.

When the x-direction moving amount of the grating is larger than the slit period but is not an integral multiplication, the visibility of the moire fringe almost never becomes 0, and the moving speed of the grating does not need to be controlled. When the moving speed of the grating is a certain speed, the visibility of the moire fringe changes according to the data collecting time. The larger the moving amount of the grating is, the visibility of the moire fringe becomes stable close to 0. For example, when the grating is moved 10.1 periods, 10 periods contribute to the absorptive image, and the moving average of the remaining 0.1 period contributes to the visibility of the moire fringe. Therefore, the visibility of the moire fringe is reduced more when the moving amount of the grating is 2.1 periods than 1.1 periods, and when the moving amount after the decimal point of the period is the same, the effect of the reduction of the visibility becomes larger as the moving amount of the grating becomes larger.

Regardless of whether the moving amount of the grating is the integral multiplication of the slit period, preferably, the moving speed while the data is collected is a constant speed. Therefore, preferably, the collecting of the data starts after the speed becomes stable. However, the moving speed is not limited to such constant speed and can move while changing speed or can be a step movement.

According to the low visibility capturing mode in the fourth embodiment, capturing is performed by continuously moving one or a plurality of gratings among the three gratings equal to or more than ¼ of the slit period of the grating.

Here, the configuration of the radiation capturing apparatus 1D in the radiation capturing system 100D according to the fourth embodiment is the same as the configuration of the radiation capturing apparatus 1A shown in FIG. 1 excluding the scatterer 113 and the moving mechanism 113a. Therefore, the illustration and the description are omitted. Described below is the capturing operation in the radiation capturing apparatus 1D and the image generating operation in the controller 5 according to the fourth embodiment.

Figure 23:
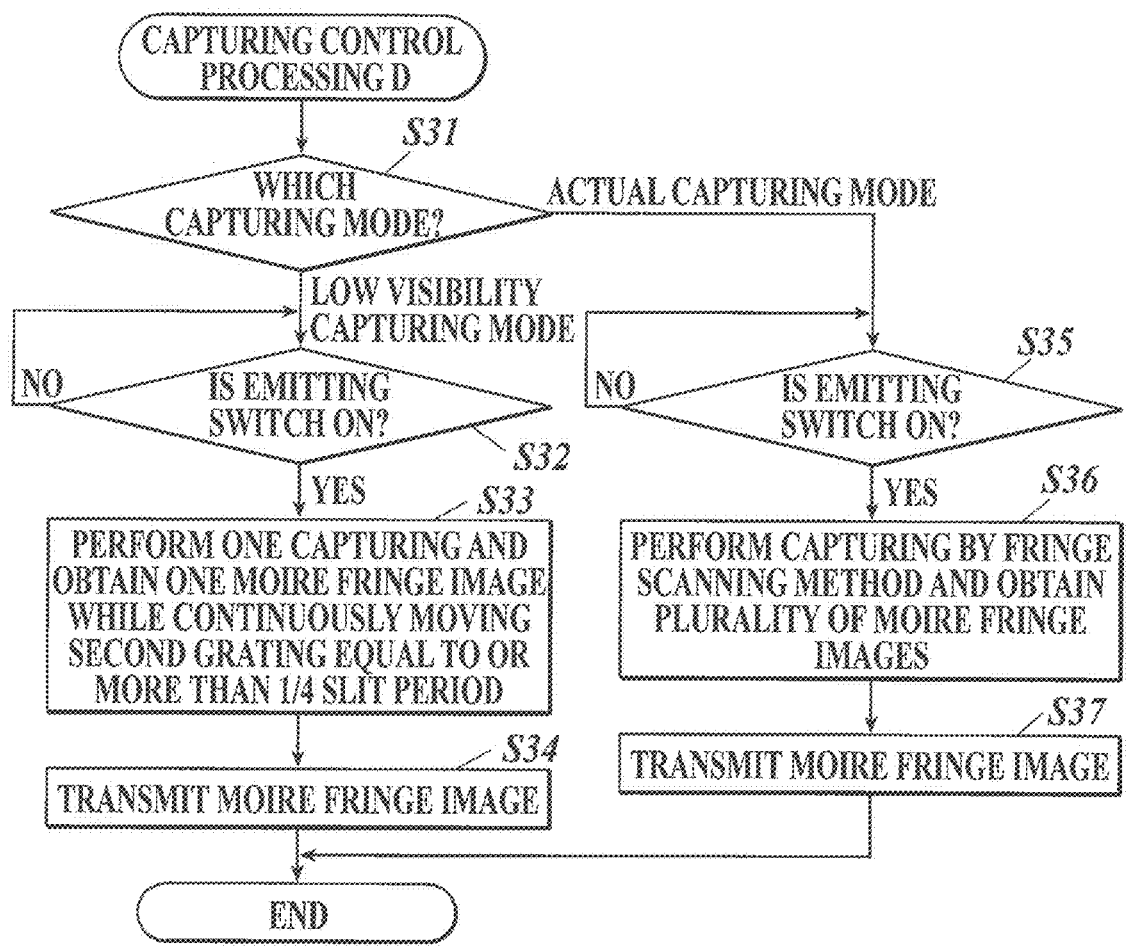
FIG. 23 is a flowchart showing the capturing control processing D performed by the radiation capturing apparatus according to the fourth embodiment.

FIG. 23 shows a flowchart of the capturing control processing D which is performed by the controller 181 of the radiation capturing apparatus 1D. The capturing control processing D is performed by the controller 181 in coordination with the program stored in the storage 185.

The controller 181 determines whether the capturing mode is the low visibility capturing mode or the actual capturing mode (step S31).

When it is determined that the capturing mode is the low visibility capturing mode (step S31; low visibility capturing mode), the controller 181 stands by for the emitting switch of the operating unit 182 to be turned on by the operator (step S32).

When the emitting switch of the operating unit 182 is turned ON (step S32; YES), the controller 181 controls the radiation source 11, the radiation detector 16, and the moving mechanism 15*a* and performs one capturing while continuously moving the second grating 15 equal to or more than ¼ of the slit period to obtain one moire fringe image (step S33). That is, after resetting the radiation detector 16 to remove unnecessary charge remaining from the previous capturing, the X-ray is irradiated for a predetermined amount of time continuously by the radiation source 11, and the charge is accumulated in the radiation detector 16 to match with the X-ray irradiating term. During the X-ray irradiating term, the moving mechanism 15*a* moves the second grating 15 in the x-direction continuously equal to or more than ¼ of the slit period. The accumulated charge is read as the image signal at the timing that the irradiating of the X-ray stops to obtain one moire fringe image. The position of the second grating 15 returns to the original position after capturing ends.

Then, the controller 181 uses the communicating unit 184 to transmit the moire fringe image to the controller 5 (step S34) and the capturing control processing D ends.

When it is determined that the capturing mode is the actual capturing mode (step S31; actual capturing mode), the controller 181 stands by for the emitting switch of the operating unit 182 to be turned ON by the operator (step S35). When the emitting switch of the operating unit 182 is turned ON (step S35; YES), the controller 181 controls the radiation source 11, the radiation detector 16, and the moving mechanism 15*a* to perform the plurality of steps (M steps) of capturing by the fringe scanning method to obtain the plurality of moire fringe images (M images) (step S36).

Then, the controller 181 uses the communicating unit 184 to transmit the moire fringe image to the controller 5 (step S37), and the capturing control processing D ends.

According to the capturing control processing D, capturing is performed while continuously moving the second grating 15. Alternatively, non-continuous movement such as step movement is possible.

When the controller 5 receives the subject moire fringe image generated in the low visibility capturing mode from the main body 18, the controller 5 generates the absorptive image and displays the generated absorptive image on the display. The process of generating the absorptive image in the controller 5 is the same as the description of the first embodiment, and the description is to be referred.

When the controller 5 receives the series of subject moire fringe images generated in the actual capturing mode from the main body 18, the controller 5 generates the three types of reconstructed images (absorptive image, differential phase image, small angle scattering image) based on the received moire fringe image. The process of generating the reconstructed image in the controller 5 is the same as the description in the first embodiment, and the description is to be referred.

(Verification Experiment of Fourth Embodiment)

Described below is the result of the verification experiment verifying the subject moire fringe image generated with the low visibility capturing mode and the transmissivity image (absorptive image) generated based on the moire fringe image.

In the verification experiment, the PMMA which is the same as in the capturing of the moire fringe images shown in FIG. 5 is to be the subject. The capturing is performed in the low visibility capturing mode as described in the fourth embodiment, and the subject moire fringe image is obtained. The transmissivity image is generated based on the generated subject moire fringe image.

The slit period of the grating and the distance between the gratings used in the verification experiment is as described in the above-described apparatus specifications. The moving speed of the second grating 15 is 125 um/sec, the data collecting time is 0.427 sec, and the moving amount in the x-direction during the data collecting is 53.375 um (10.07 periods).

Figures 24A, 24B, 24C, 24D:
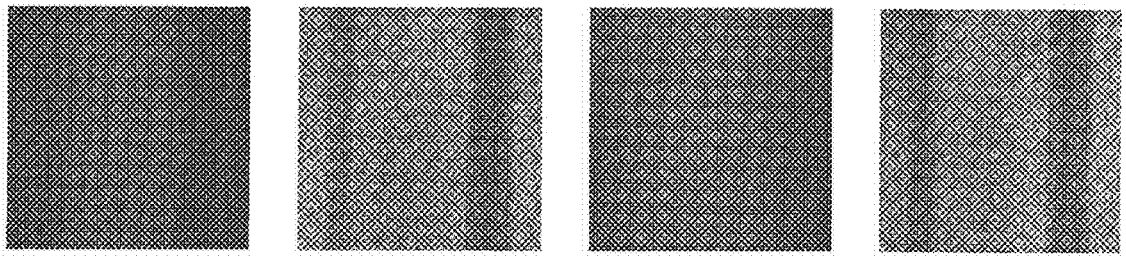
FIG. 24A is a moire fringe image obtained by capturing while moving the second grating continuously in a x-direction no less than the slit term.
FIG. 24B is an image generated by dividing the moire fringe image shown in FIG. 24A by the added image of the BG moire fringe image for generating the reconstructed image.
FIG. 24C is a BG moire fringe image obtained by capturing with the low visibility capturing mode while continuously moving the second grating in the x-direction without positioning the subject.
FIG. 24D is a transmissivity image generated by dividing the moire fringe image shown in FIG. 24A by the BG moire fringe image shown in FIG. 24C.

FIG. 24A is a moire fringe image obtained by capturing in the above-described low visibility capturing mode, that is, while continuously moving the second grating 15 equal to or more than the slit period in the x-direction. As shown in FIG. 24A, the moire fringes are almost gone, and the image close to the moire fringe image shown in FIG. 7A is obtained.

FIG. 24B is an image generated by dividing the moire fringe image shown in FIG. 24A by the image adding the BG moire fringe images for generating the reconstructed image. As shown in FIG. 24B, when the moire fringe image shown in FIG. 24A is divided by the added image of the BG moire fringe image for generating the reconstructed image, the transmissivity image correcting the absorption unevenness and the defect of the grating not moved and the sensitivity unevenness of the detector is obtained. The defects of the moved grating appear as false images of white spots and black spots. Since the added BG moire fringe image stored in the controller 5 in advance is used, there is the merit that the grating does not need to be moved in the x-direction and the BG moire fringe image does not have to be captured (held).

FIG. 24C shows the BG moire fringe images obtained by capturing in the above-described low visibility capturing mode without providing the subject while continuously moving the second grating 15 in the x-direction. FIG. 24D is the transmissivity image generated by dividing the moire fringe image shown in FIG. 24A by the BG moire fringe image shown in FIG. 24C. According to the example shown in FIG. 24D, the capturing is performed with the moving start position of the second grating 15 being different when the subject is positioned and when the subject is not positioned. Therefore, although the false images of the white spots and the black spots appear, the absorption unevenness and the defect of the moved grating can be corrected if the moving start position and the moving amount are the same.

According to the above-described verification experiment, the moving of the second grating 15 in the x-direction is shown. As described above, a similar effect can be obtained when the other gratings or a plurality of gratings are moved in the x-direction.

As described above, capturing is performed while moving one or the plurality of gratings among the three gratings which are the multi-slit 12, the first grating 14, and the second grating 15 equal to or more than ¼ of the slit in the x-direction. With this, the image with the visibility of the moire fringe reduced close to 0 can be obtained. Therefore, the absorptive image can be generated by one capturing as in the conventional simple X-ray capturing apparatus without removing the grating from the field of view.

The "slit period direction (x-direction)" which is the moving direction of the grating is to substantially match with the x-direction and includes when it is slightly shifted.

The first to fourth embodiments are described above, but the descriptions of the embodiments merely describe one preferable example of the present invention, and the present invention is not limited to the above.

For example, according to the embodiments described above, the radiation capturing apparatus uses the Talbot-Lau interferometer which moves the second grating 15 with respect to the multi-slit 12 and the first grating 14 when capturing is performed by the fringe scanning method. Alternatively, the present invention may employ the radiation capturing apparatus which uses the Talbot-Lau interferometer which moves one or two gratings among the multi-slit 12, the first grating 14, or the second grating 15 in the capturing by the fringe scanning method. Alternatively, the present invention may employ the radiation capturing apparatus which uses the Talbot interferometer which moves either the first grating 14 or the second grating 15 with respect to the other grating. Alternatively, the present invention may employ the radiation capturing apparatus which uses the Lau interferometer which moves the multi-slit 12 or the first grating 14 with respect to the other grating. The present invention can be applied to the Talbot-Lau interferometer, the Talbot interferometer, and the Lau interferometer which use the Fourier transform which does not need fringe scanning.

The other detailed configuration and detailed operation of each unit included in the radiation capturing system according to the present invention can be suitably changed without leaving the scope of the present invention.

What is claimed is:

1. A radiation capturing system comprising:
   a radiation source, a plurality of gratings, and a radiation detector, provided aligned in a radiation irradiating axis direction;
   a Talbot interferometer or a Talbot-Lau interferometer to capture a plurality of moire fringe images for generating a reconstructed image in an actual capturing mode;
   a low visibility capturing unit which performs capturing of one subject moire fringe image in a low visibility capturing mode with visibility of a moire fringe reduced relative to the plurality of moire fringe images captured by a changing of relative positions of the plurality of gratings with respect to a grating position while the capturing of the one subject moire fringe image is performed;
   a controller configured to determine whether a capturing mode is the low visibility capturing mode or the actual capturing mode; and
   a generating unit configured to generate an absorptive image based on only the one subject moire fringe image captured by the low visibility capturing unit when the capturing mode is the lower visibility capturing mode and to generate the reconstructed image based on the plurality of moire fringe images when the capturing mode is the actual capturing mode.

2. The radiation capturing system according to claim 1, wherein the low visibility capturing unit reduces the visibility of the moire fringe by performing capturing in a state that at least one of the plurality of gratings is moved or rotated with respect to a grating position in capturing the one subject moire fringe image.

3. The radiation capturing system according to claim 1, wherein the radiation capturing system captures the plurality of moire fringe images for generating the reconstructed image by a fringe scanning method.

4. The radiation capturing system according to claim 1, wherein the radiation source, the plurality of gratings, and the radiation detector together form a radiation capturing apparatus, the radiation capturing apparatus is operable in the actual capturing mode as the Talbot interferometer or the Talbot-Lau interferometer and in the low visibility capturing mode as the low visibility capturing unit, wherein the absorptive image can be generated for confirming positioning of the subject by capturing the only the one subject moire fringe image with the low visibility capturing unit before capturing the plurality of moire fringe images that are captured in the actual capturing mode to generate the reconstructed image.

5. The radiation capturing system according to claim 1, wherein the low visibility capturing unit performs the continuous changing of the relative positions of the plurality of gratings during irradiation by the radiation source and accumulation of charge by the radiation detector for the capturing of the one subject moire fringe image.

6. The radiation capturing system according to claim 1, further comprising an operating unit configured to receive a user input for setting the capturing mode to the low visibility capturing mode or the actual capturing mode.

7. The radiation capturing system according to claim 2, wherein the low visibility capturing unit reduces the visibility of the moire fringe by performing capturing in a state that the at least one of the plurality of gratings is rotated around the radiation irradiating axis with respect to the grating position in capturing of the one subject moire fringe image.

8. The radiation capturing system according to claim 2, wherein the low visibility capturing unit reduces the visibility of the moire fringe by performing capturing in a state that the at least one of the plurality of gratings is moved in the radiation irradiating axis direction with respect to the grating position in capturing of the one subject moire fringe image.

9. The radiation capturing system according to claim 2, wherein the low visibility capturing unit reduces the visibility of the moire fringe by performing capturing while continuously moving the at least one of the plurality of gratings equal to or more than ¼ of a slit period in a slit period direction of the grating.

10. The radiation capturing system according to claim 9, wherein a moving distance of the at least one of the plurality of gratings in the slit period direction is an integral multiplication of the slit period of the grating.

* * * * *